(12) United States Patent
Subbu et al.

(10) Patent No.: US 8,005,733 B2
(45) Date of Patent: Aug. 23, 2011

(54) METHODS AND INTERFACE FOR SET-PARTITIONING DECISION SUPPORT TOOL

(75) Inventors: Rajesh Venkat Subbu, Clifton Park, NY (US); Kete Chalermkraivuth, Niskayuna, NY (US); Jose R. Celaya, Troy, NY (US); James G. Russo, Milford, CT (US); John Andrew Ellis, Niskayuna, NY (US); Hoai-Hai Doan, Stamford, CT (US); Melissa Ialeggio, Westport, CT (US); Matthew Allen, Allen, TX (US)

(73) Assignee: General Electric Capital Corporation, Stanford, CT (US)

( * ) Notice: Subject to any disclaimer, the term of this patent is extended or adjusted under 35 U.S.C. 154(b) by 1271 days.

(21) Appl. No.: 11/647,120

(22) Filed: Dec. 28, 2006

(65) Prior Publication Data

US 2008/0162238 A1    Jul. 3, 2008

(51) Int. Cl.
*G06Q 40/00*    (2006.01)
(52) U.S. Cl. ......... 705/35; 705/36 T; 705/36 R; 705/37; 705/313; 705/27; 705/10; 705/39; 705/306; 706/13; 348/362; 709/221
(58) Field of Classification Search ............ 705/39, 705/306, 35–37, 10, 27; 706/13; 348/362; 709/221
See application file for complete search history.

(56) References Cited

U.S. PATENT DOCUMENTS

| | | | |
|---|---|---|---|
| 6,003,018 A | 12/1999 | Michaud et al. | |
| 6,173,276 B1 | 1/2001 | Kant et al. | |
| 7,120,599 B2 * | 10/2006 | Keyes | 705/36 R |
| 7,305,328 B1 | 12/2007 | Fleming et al. | |
| 2002/0013750 A1 * | 1/2002 | Roberts et al. | 705/35 |
| 2003/0229552 A1 * | 12/2003 | Lebaric et al. | 705/35 |
| 2005/0010516 A1 | 1/2005 | Ivanov et al. | |
| 2005/0080701 A1 | 4/2005 | Tunney et al. | |
| 2005/0187847 A1 | 8/2005 | Bonissone et al. | |
| 2008/0097768 A1 | 4/2008 | Godshalk | |
| 2008/0120251 A1 | 5/2008 | Tyagi et al. | |
| 2008/0163085 A1 | 7/2008 | Subbu et al. | |

OTHER PUBLICATIONS

"A hybrid heuristic approach to discrete multi-objective optimization of credit portfolios"; Frank Schlottmann, and Detlef Seese; Institute AIFB, Department of Economics, University Karlsruhe (TH), D-76128, Karlsruhe, Germany Accepted Nov. 8, 2003.*

Subbu, Raj et al., "Multiobjective Financial Portfolio Design: A Hybrid Evolutionary Approach", Computing and Decision Sciences, General Electric Global Research Center, Niskayuna, NY 12309 USA, imagination at work GE. 12pgs.

(Continued)

*Primary Examiner* — Harish T Dass
(74) *Attorney, Agent, or Firm* — Buckley, Maschoff & Talwalker LLC

(57) ABSTRACT

A visual interactive multi-criteria decision-making method and computer-based apparatus for portfolio management. The method/apparatus supports partitioning of a portfolio of physical or other assets into two mutually exclusive categories, such as assets recommended for sale and assets recommended for retention. The method/apparatus utilizes one or more coupled 2-D projections of the portfolio in criteria space. The user interacts with the projections to express and record preferences.

10 Claims, 35 Drawing Sheets

OTHER PUBLICATIONS

M. Köksalan and O Rizi, "A visual interactive approach for multiple criteria decision making with monotone utility functions", Journal of the Operational Research Society (2001) vol. 52, No. 6. © 2001 Operational Research Society Ltd. 0160-5682. pp. 665-672.

Hans L. Trinkaus and Thomas Hanne, "knowCube: a visual and interactive support for multicriteria decision making", Computer & Operations Research, 32 (2005), pp. 1289-1309. 0305-0548, © 2005 Elsevier Ltd.

I.S.J. Packham, M.Y. Rafiq, M.F. Borthwick, and S.L. Denham; "Interactive visualization for decision support and evaluation of robustness—in theory and in practice", Advanced Engineering Informatics 19 (2005), pp. 263-280. 1474-0346. © 2005 Elsevier Ltd.

Ronald Klimberg and Robert M. Cohen, Theory and Methodology, "Experimental evaluation of a graphical display system to visualizing multiple criteria solutions", European Journal of Operational Research 119 (1999), pp. 191-208, PII: S0377-2217, © 1999 Elsevier Science B.V.

Carlos Henggeler Antunes and João Clímaco, "Decision aid for discrete alternative multiple criteria problems: A visual interactive approach", North-Holland, Information and Decision Technologies 19 (1993) pp. 185-193, SSDI: 0923-0408(93)00531-W. © 1994 Elsevier Science B.V.

Yee Swian Tan and Niall M. Fraser, "The Modified Star Graph and the Petal Diagram: Two New Visual Aids for Discrete Alternative Multicriteria Decision Making", Journal of Multi-Criteria Decision Analysis, vol. 7, pp. 20-33 (1998). CCC: 1057-9214. © 1998 John Wiley & Sons, Ltd.

Albert A. Angehrn and Hans-Jakob Lüthi, "Intelligent Decision Support Systems: A Visual Interactive Approach", Interfaces 20: Nov. 6-Dec. 1990 (pp. 17-28).

Subbu, Raj et al., "Multiobjective Financial Portfolio Design: A Hybrid Evolutionary Approach", 0-7803-9365, May 2005, pp. 1722-1729. © 32005 IEEE.

* cited by examiner

| | A | B | C | D | E | F | G | H | I |
|---|---|---|---|---|---|---|---|---|---|
| | | | | | | 06 NI | 07 NI | EcoGiveUp | EGU/ |
| 1 | Country | MgtStruct | BusSeg | PropType | SalesCat | $M | $M | $M | ratio |
| 2 | text | text | text | text | text | | | | |
| 3 | United States | North America Equity | Multi-Family | JV | LT Hold (enviro/other) | 33.324541 | 44.189649 | 48.8142576 | 1.1648 |
| 4 | United Kingdom | Europe | United Kingdom | JV | Under Construction | -5.681046106 | 7.874110844 | 37.42694999 | -4.282 |
| 5 | United States | North America Equity | Office | JV | Lease Up | -7.0928802 | 16.6029534 | 24.32429773 | -3.429 |
| 6 | United States | North America Equity | NAE Strategic Ventures | JV | LT Hold (enviro/other) | 7.487631059 | 18.71988138 | 21.44802318 | 1.7315 |
| 7 | Canada | North America Debt | Canada | REO | Planned Sale 2006 | 0 | 0 | 19.21422029 | 0 |
| 8 | United States | North America Equity | SPA-NAEI | JV | LT Hold (strategic) | -1.667788568 | 8.733813894 | 18.14368121 | -10.87 |
| 9 | France | Europe | France | REO | Lease Up | 7.131336164 | 11.6575271 | 18.09151847 | 1.6486 |
| 10 | United States | North America Equity | NAE Strategic Ventures | JV | Under Construction | 0 | 0 | 15.8187565 | 0 |
| 11 | United States | North America Equity | SPA-NAEI | JV | Lease Up | 2.814064432 | 7.186877744 | 14.04234.39 | 4.9900 |
| 12 | United States | North America Equity | SPA-NAEI | JV | Planned Sale 2007 | -1.03235 | 5.17645 | 12.02598142 | -11.64 |
| 13 | United Kingdom | Europe | United Kingdom | REO | Lease Up | 7.126997804 | 12.9745215 | 10.75685005 | 0.9810 |
| 14 | United Kingdom | Europe | United Kingdom | JV | Planned Sale 2007 | 17.4733502 | 0 | 10.46127939 | 0.389 |
| 15 | France | Europe | France | REO | Planned Sale 2007 | 30.70924026 | 0 | 10.31601102 | 0.2183 |
| 16 | United Kingdom | Europe | United Kingdom | JV | Under Construction | -5.426823588 | -4.570728121 | 9.973434676 | -1.194 |
| 17 | United States | North America Equity | SPA-NAEI | JV | Planned Sale 2007 | 7.529517784 | 11.06677174 | 9.857239416 | 1.309 |
| 18 | United Kingdom | Europe | United Kingdom | REO | Planned Sale 2007 | 1.99626814 | 0 | 9.810680968 | 3.194 |
| 19 | United Kingdom | Europe | United Kingdom | JV | Planned Sale 2007 | 4.616977536 | 0 | 9.801354154 | 1.3798 |
| 20 | Japan | Asia Pacific | Japan | JV | Planned Sale 2007 | 15.95683474 | 18.66576606 | 9.657743243 | 0.3934 |
| 21 | Spain | Europe | Spain | JV | LT Hold (strategic) | 2.454271115 | 6.474374774 | 9.410974723 | 2.4924 |
| 22 | United States | North America Equity | Belmont | JV | LT Hold (strategic) | 2.829995871 | 3.788679289 | 9.272398544 | 3.2764 |
| 23 | United Kingdom | Europe | United Kingdom | REO | Lease Up | 0.623256067 | 6.809896337 | 9.066631454 | 9.4556 |
| 24 | United States | North America Equity | SPA-NAEI | JV | LT Hold (strategic) | 0 | 0 | 8.82960034 | 0 |
| 25 | Central Europe | Europe | Central Europe | JV | LT Hold (strategic) | 1.716185667 | 3.676578784 | 8.82957712 | 3.344 |
| 26 | Australia | Asia Pacific | Australia | REO | LT Hold (strategic) | 1.299753365 | 6.005716161 | 8.565530704 | 4.2835 |
| 27 | Korea | Asia Pacific | Korea | REO | LT Hold (strategic) | 15.25648389 | 19.77744085 | 8.532423185 | 0.3635 |
| 28 | Korea | Asia Pacific | Korea | JV | LT Hold (strategic) | 2.191726932 | 6.549017153 | 8.422307446 | 2.4978 |
| 29 | Central Europe | Europe | Central Europe | JV | Under Construction | 0.840416503 | 3.143519343 | 8.419198485 | 6.5116 |
| 30 | United States | North America Equity | SPA-NAEI | REO | Ptr Approval (Highly Unlikely) | -0.855329464 | 1.355556799 | 8.292112248 | -9.694 |
| 31 | France | Europe | France | JV | Planned Sale 2007 | 0.383224233 | 0 | 8.118425676 | 13.769 |
| 32 | Japan | Asia Pacific | Japan | JV | LT Hold (strategic) | 0.684347 | 0.3668652 | 7.497870971 | 71.215 |
| 33 | United States | North America Equity | NAD Liquidating Portfolio | JV | Planned Sale 2007 | 43.060674 | 21.786789 | 7.471981548 | 0.1735 |
| 34 | France | Europe | France | REO | Lease Up | 22.36609264 | 24.6918233 | 7.462562551 | 0.2168 |

METHODS AND INTERFACE FOR SET-PARTITIONING DECISION SUPPORT TOOL

FIELD

The present invention relates to computer systems and more particularly to computer systems that aid in making decisions relating to multiple criteria.

BACKGROUND

Some business or other institutional decisions present numerous variables and require consideration of a number of different criteria. The criteria in question sometimes require trade-offs, since the problem in question may not allow for a solution that permits optimization in accordance with all criteria.

For example, managing a real estate portfolio can present significant challenges, particularly if the portfolio includes hundreds or thousands of properties. It can be difficult both to determine an appropriate strategy and to apply the strategy to generate hold/sell decisions with respect to numerous individual properties. U.S. Published Patent Application no. 2005/0187847 ("the '847 application") is commonly assigned herewith and has some common inventors herewith. The '847 application employs approaches such as an evolutionary algorithm with pareto sorting, a target objectives genetic algorithm, dominance filtering, and user visualization to detect and fill gaps in an efficient pareto frontier, all for the purpose of automatically generating and evaluating solutions to a portfolio optimization problem.

The '847 application generally relies on machine intelligence to identify an optimal or near optimal portfolio solution, and represents an advance of the art. However, the present inventors have recognized that it may be desirable to develop alternative or back-up portfolio management techniques that rely primarily on human intelligence for solving a particular problem while providing data input, data manipulation, and data visualization support to the human decision-maker.

SUMMARY

To provide alternatives to, or alleviate problems inherent in, the prior art, the present invention introduces improved systems and methods and computer interfaces for aiding a decision-maker in partitioning a set of items. For example, a portfolio of real estate properties may be partitioned into a set of properties to be sold and a set of properties to be retained.

According to one embodiment, a method includes assigning a respective partitioning preference score to each item in a population of items to be partitioned. The method also includes displaying a slider bar on a computer display screen, allowing a user to interact with the slider bar to select a partitioning threshold, and partitioning the population of items based on (a) the partitioning threshold and (b) the partitioning preference scores assigned to the items.

According to a further embodiment, a method includes displaying a slider bar on a computer display screen, displaying a bubble graph on the display screen simultaneously with the slider bar, receiving input from a user's interaction with the slider bar, and changing the bubble graph in response to the input from the user.

According to still a further embodiment, a method includes calculating at least one preference contribution for each item of a population of items. The calculation includes multiplying a preference factor by a weight value. Some of the resulting preference contributions are less than zero and some are greater than zero.

This method further includes, with respect to each of the items, summing all preference contributions for the item in question to generate a raw partition score for the item in question. The method also includes mapping such of the partition scores that are less than zero to a first interval of numbers to generate first mapped partition scores, and mapping such of the partition scores that are greater than zero to a second interval of numbers to generate second mapped partition scores. Each of the first mapped partition scores and the second mapped partition scores is for a respective one of the items.

In addition, this method includes receiving a selection of a partition threshold, and partitioning the population of items such that items having a mapped partition score greater than the partition threshold are placed in a first category (e.g., "to be sold" in the case of a real estate portfolio), and items having a mapped partition score less than the partition threshold are placed in a second category (e.g., "to be retained" in the case of the real estate portfolio).

According to yet a further embodiment, a method includes receiving an indication (e.g., from a user) of a first partitioning preference with respect to a first subgroup of a population of items. The method further includes receiving an indication of a first weighting factor that is applicable to the first subgroup. The method also includes receiving an indication of a second partitioning preference with respect to a second subgroup of the population of items. In addition, the method includes receiving an indication of a second weighting factor that is applicable to the second subgroup. Still further, the method includes receiving an indication of a third partitioning preference with respect to a third subgroup of the population of items, and receiving an indication of a third weighting factor that is applicable to the third subgroup. Also, the method includes multiplying the first weighting factor with a value that corresponds to the first partitioning preference to generate a first product. Further, the method includes multiplying the second weighting factor with a value that corresponds to the second partitioning preference to generate a second product. Still further, the method includes multiplying the third weighting factor with a value that corresponds to the third partitioning preference to generate a third product. The method also includes using the first, second and third products to generate a respective raw partition score for at least some of the items. In addition, the method includes mapping the raw partition scores to an interval of numbers to generate mapped partition scores for each of the items. Further, the method includes receiving an indication of a partition threshold, and partitioning the population of items based at least in part on the partition threshold and the mapped partition scores.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 4 is a spreadsheet display that shows data concerning properties making up a real estate portfolio to be partitioned, in accordance with some embodiments, by utilizing the method of FIGS. 3A and 3B.

FIG. 34 is a spreadsheet display that lists individual properties recommended for sale as a result of a partition of a real estate portfolio using the process of FIGS. 3A and 3B.

DETAILED DESCRIPTION

Figure 1:
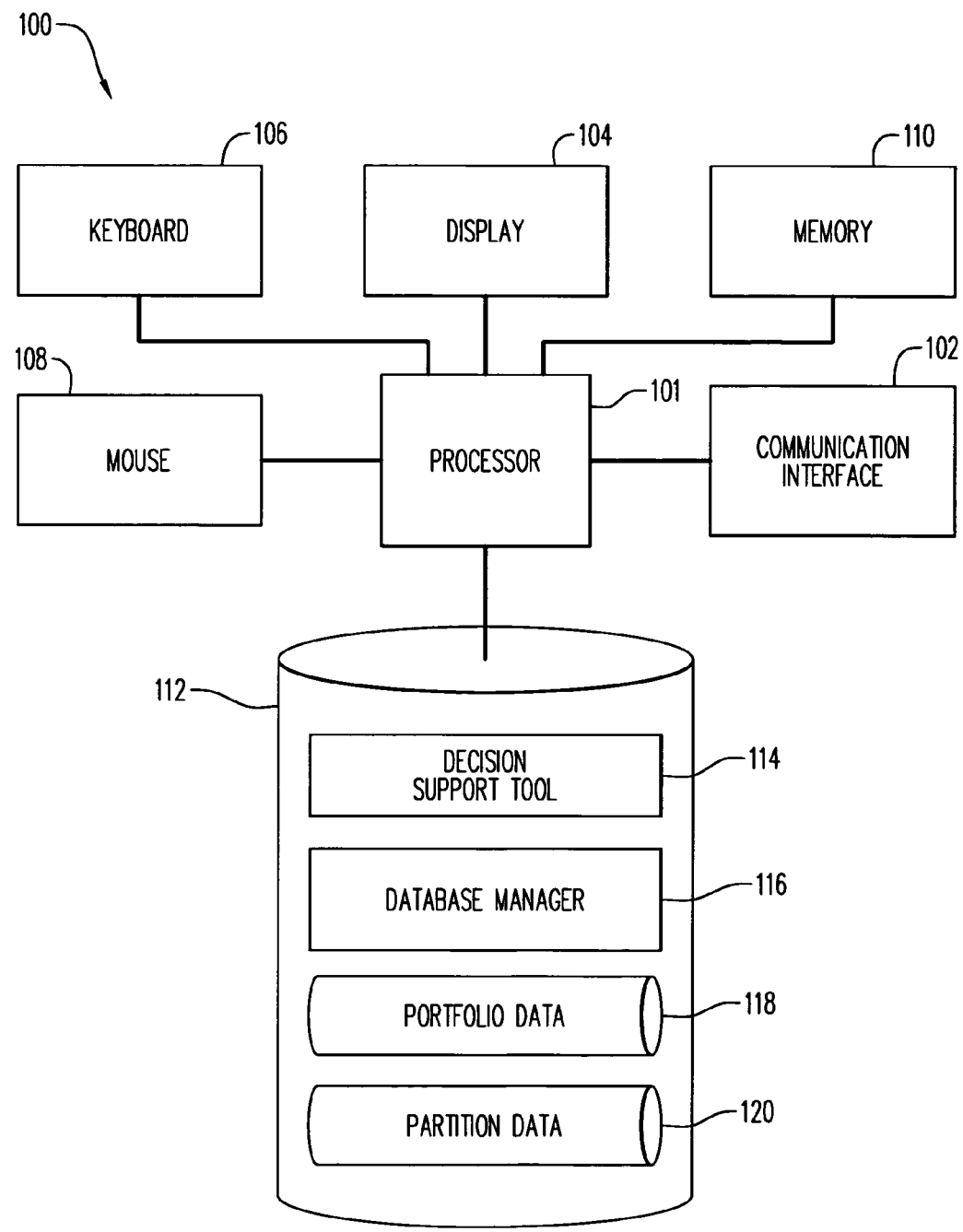
FIG. 1 is a block diagram of a computer system provided in accordance with some embodiments.

To introduce some concepts of the invention in a general way, a graphical user interface, and related computer-based calculation methods, are provided to facilitate decision-making for the purpose of partitioning a set of items (e.g. identifying which properties in a real estate portfolio are to be sold, and which retained). It is assumed that a number of different criteria are pertinent to the decision, and that trade-offs, or other relationships between criteria, may need to be established to arrive at the decision. It is also assumed that the items to be partitioned are represented by a database that reflects relevant attributes of the items. The data from the database may be accessed by the computer system to perform calculations that reflect a user's preferred approaches to solving a partitioning problem.

The GUI may include a display screen that has a number of panels with which the user may interact to enter preferences with regard to trade-offs or other relationships between criteria. Each panel may also allow the user to select a portion of the set of items to which the user's preferences are applicable. One embodiment of the panels may call for scatter-plot graphs in which each data point represents an item of the set of items that is to be partitioned. The axes of each graph each correspond to a criterion to be used in partitioning the set of items. In the case of partitioning a real estate portfolio for sale or retention, the criteria may be financial attributes (e.g., measures of value, yield, income, risk, etc.) for each property. As a result, each graph defines a two-dimensional projection in criteria space. The user is allowed to draw a rectangle or other shape on the graph to select data points (and the corresponding items) for a partitioning category which the user prefers, relative to the particular pair of criteria. The selection of data points for a given categorization preference may implicitly represent a trade-off between the two criteria. The user may also be allowed to select a weight to be given, with respect to the preferences indicated in each graph, in making the over-all partitioning recommendation.

The various user trade-off/criteria space recommendations entered via the preference input panels may be aggregated by the computer system to generate a partitioning preference score for each of the items in the set to be partitioned. The GUI screen display may also include a slider bar or other GUI element to permit the user to input a preferred partitioning threshold. The computer system may split the set of items by applying the threshold to the partitioning preference scores that have been assigned to the items. The particular split recommended by the computer system may be readily changed by the user by changing the value of the partitioning threshold, while maintaining the relative effects of the trade-offs and other criteria-based preferences previously input by the user.

There may also be provided, as another panel in the GUI display screen, a scatter-plot or bubble graph to illustrate aspects of the proposed set partition that falls out of the preferences input by the user and the calculations performed by the computer to normalize and apply the user's preferences.

FIG. 1 is a block diagram of a computer system 100 which may be provided according to certain embodiments of the invention. In its hardware aspects the computer system may be entirely conventional, but the computer system may be programmed with software so that it performs functions in accordance with aspects of the invention.

The computer system 100 includes a processor 101, which may be a conventional microprocessor, or a number of processors operating in parallel. The processor 101 is in data communication with a communication interface 102, through which the computer system 100 is able to communicate with other devices, such as other computers. The processor 101 is also in data communication with a display screen 104, by which the computer system provides visual output to a user of the computer system. There may also be one or more printers (not shown) coupled to the processor 101 to allow the computer system to provide printed output. The computer system 100 may also include one or more input devices, such as a keyboard 106 and a computer mouse 108 or other pointing device. The keyboard 106 and the mouse 108 are in data communication with the processor 101. As discussed in more detail below, the computer system 100 is programmed to provide a graphical user interface via the display screen 104 and the mouse 108.

The computer system also includes random access memory and/or other solid state memory devices, all represented by block 110 in FIG. 1, and all in communication with the processor 101. As is conventional, the memory 110 may provide temporary program storage and/or working memory capabilities.

Also included in the computer system 100 is a storage device 112, such as a conventional hard disk drive or group of hard drives, in data communication with the processor 101. The storage device 112 may store a number of programs, such as a decision support tool program 114, which is described below, and which is provided in accordance with the invention to control the processor 101 so that the computer system 100 operates in accordance with one or more aspects of the present invention. The storage device 112 may also store a conventional database manager program 116.

Also stored in the storage device 112 are one or more databases and/or data structures, including for example a real estate portfolio database 118. The real estate portfolio database 118 may store financial information and/or other attributes pertaining to each property included in a portfolio of real estate properties. The decision support tool 114, as will be seen, may be operable by a user of the computer system 100 to partition the portfolio into a group of properties recommended for sale and a group of properties recommended to be retained. Block 120 in FIG. 1 represents a database containing data resulting from operation of the decision support tool 114, including hold or sell recommendations with respect to each property.

The storage device 112 may also store other programs (not indicated in the drawings) such as a conventional operating system, one or more device drivers, and a conventional spreadsheet program.

Further, the computer system 100 may include one or more drives (not indicated in the drawing) for reading data from and/or writing data to removable data storage media.

Figure 2:
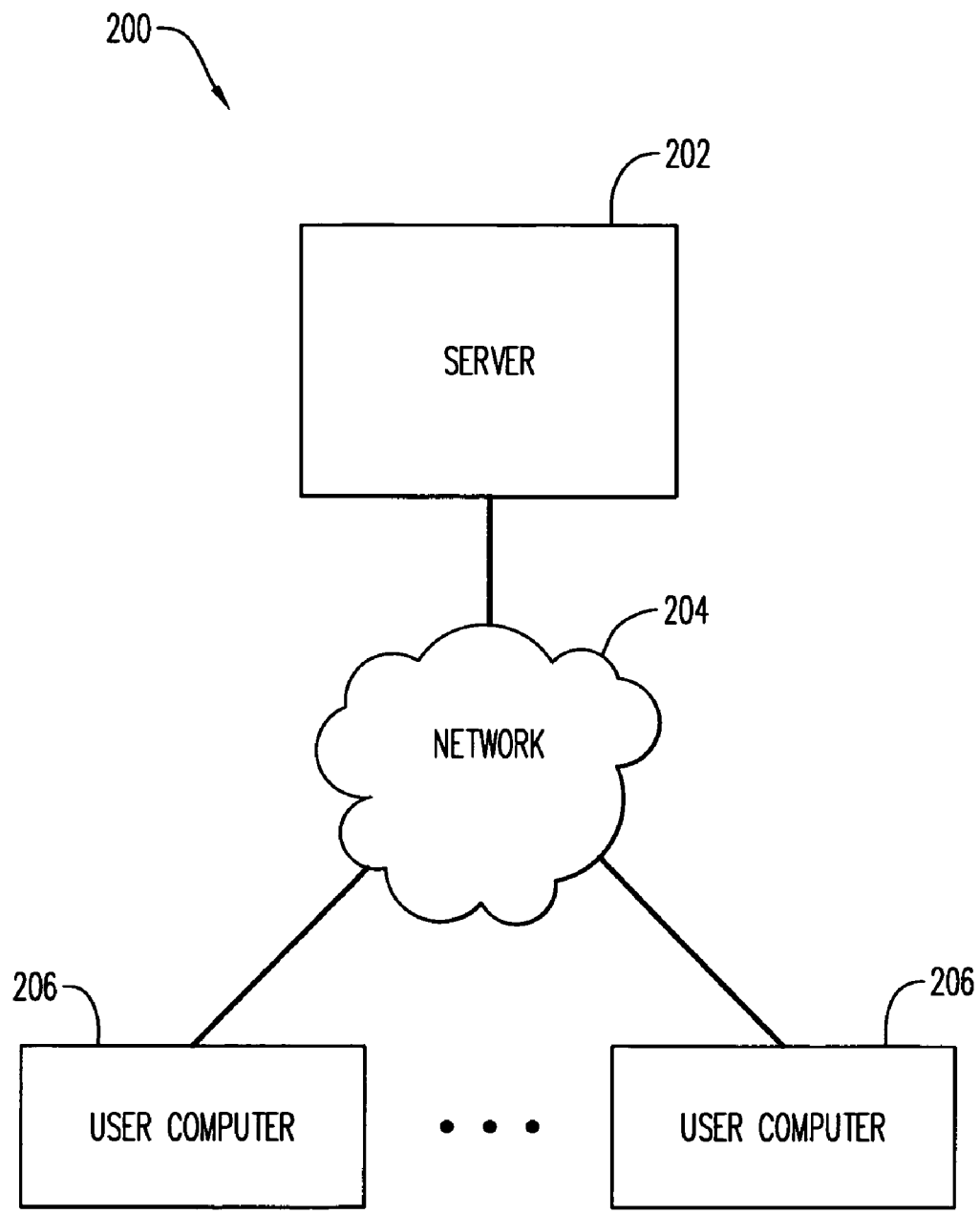
FIG. 2 is a block diagram of a networked computer system provided in accordance with some other embodiments.

FIG. 2 is a block diagram of a networked computer system 200, which is an alternative embodiment of the invention. The computer system 200 includes a server computer 202, connected (at least from time to time) via a data communication network 204 to one or more user computers 206. In terms of its hardware aspects, the computer system 200 may be entirely conventional.

The user computers 206 may include, among other conventional features, browser software, a display screen and a mouse or other pointing device (none of which are separately shown) to allow the user computers to interact as client devices with screen display pages downloaded from the server 202. The server may store a real estate portfolio database (not separately indicated), or other asset database and may be programmed to provide to the user computers the decision support tool functionality which will be described below.

Figure 3A:
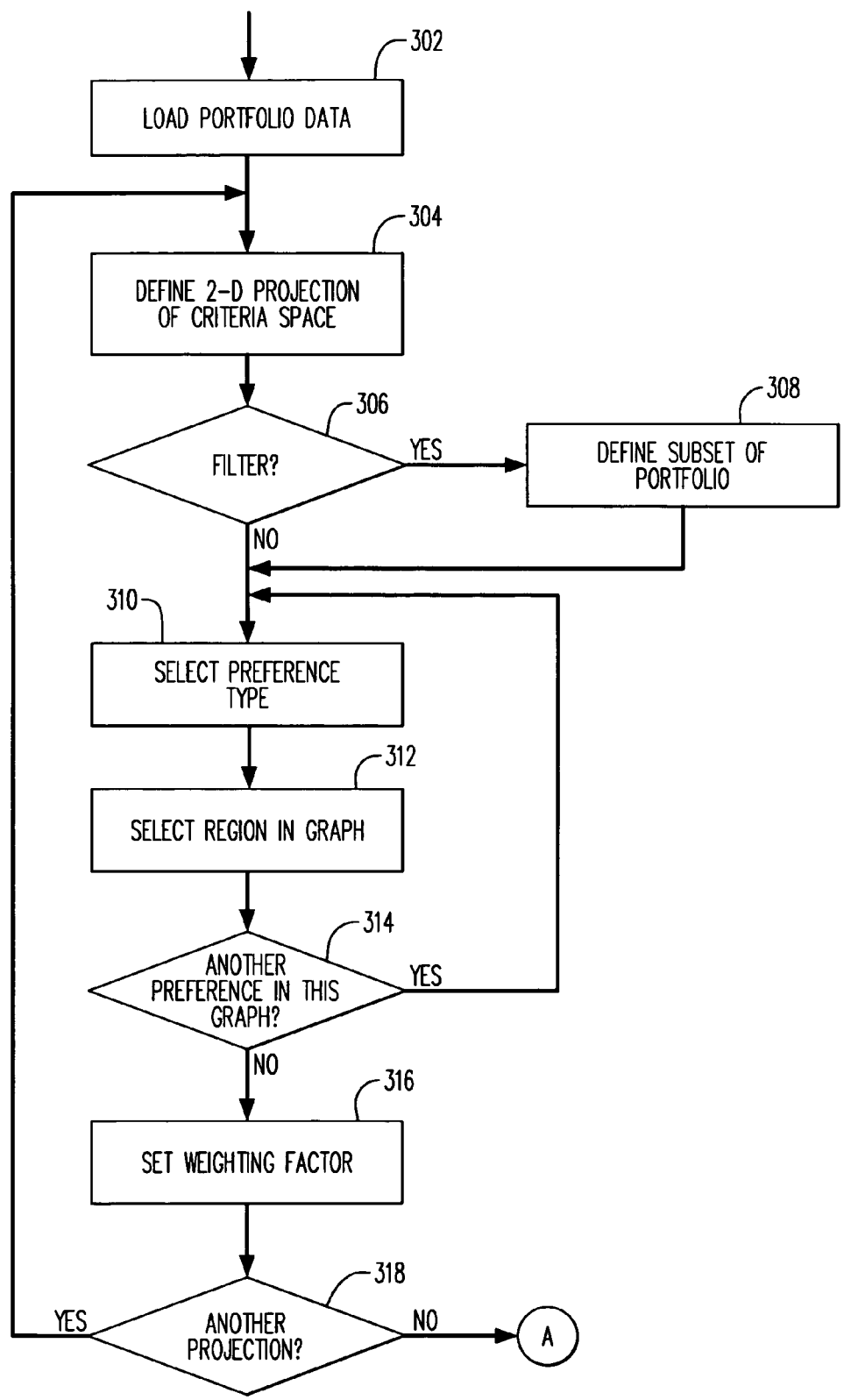
FIGS. 3A and 3B together form a flow chart that illustrates a process that may be performed, in accordance with aspects of the present invention, in the computer systems of FIGS. 1 and 2.
Figure 3B:
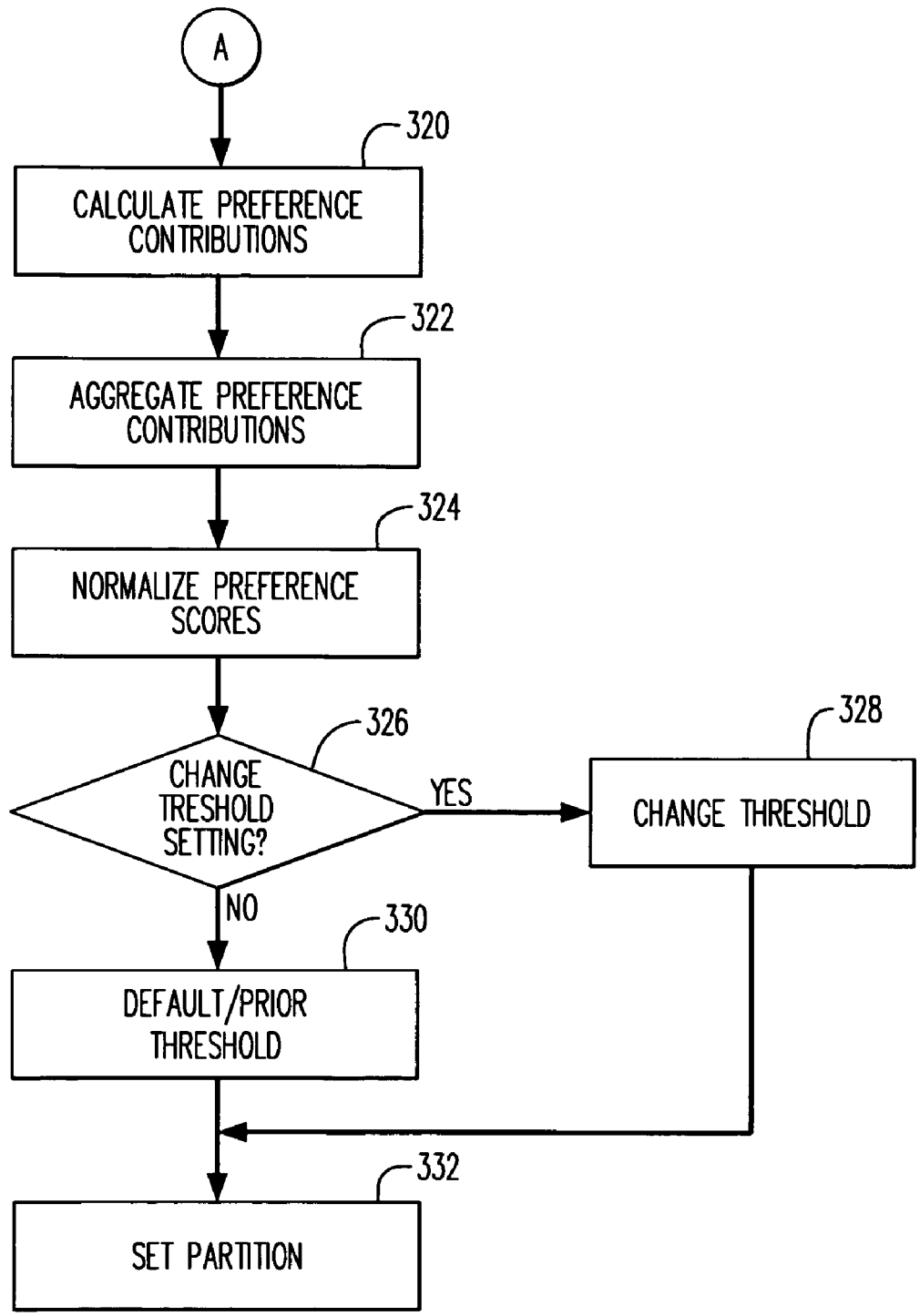

FIGS. 3A and 3B together form a flow chart that illustrates a process that may be performed, in accordance with aspects of the present invention, in the computer systems of FIGS. 1 and 2. In particular, the flow chart describes an example of operation of the decision support tool referred to above (e.g., as shown in FIG. 1 as block 114).

At 302, data is loaded into the decision support tool so that the decision support tool can process the data, under the guidance of the user, to produce a partition of items represented by the data. The data may be loaded from or accessible in the portfolio database 118 (FIG. 1) or in a similar database maintained in the server computer 202 (FIG. 2). In some embodiments, the data may include financial and other data concerning real properties which make up a portfolio of real properties. The properties may include, for example, office buildings, shopping centers and other commercial properties and/or residential rental properties.

FIG. 4 is a screen display that may be presented on the display screen 104 (FIG. 1) of the computer system 100 or on a display screen (not separately indicated) of one of the user computers 206. The screen display of FIG. 4 illustrates in spreadsheet form data concerning a real estate portfolio which a user desires to partition into "hold" and "sell" categories by use of the decision support tool. Reviewing the column headings, each column may represent a respective attribute of the properties which correspond to the rows of the spread sheet. The attributes may include the geographic location, the business unit which is charged with responsibility for the property, the type of property, whether it is wholly owned or is the subject of a joint venture, the status of the property and various financial attributes of the property.

The financial attributes may include: (a) the amount of gain (also referred to as "net income" or "NI") that could be realized by selling the property in the current year; (b) the amount of gain that could be realized by selling the property next year; (c) the "economic give-up", i.e., the amount of gain and other income that may be foregone if the property is sold in the current year, (d) one or more factors related to risk involved in holding the property; (e) one or more measures of current income (e.g., rental income net of operating expenses) and/or yield; and (f) one or more measures of book and/or market value. In some preferred embodiments, the number of financial attributes may be about ten attributes.

The data for each property may also include a unique identifier for the property to aid in managing data which pertains to the property in question.

Figure 5:
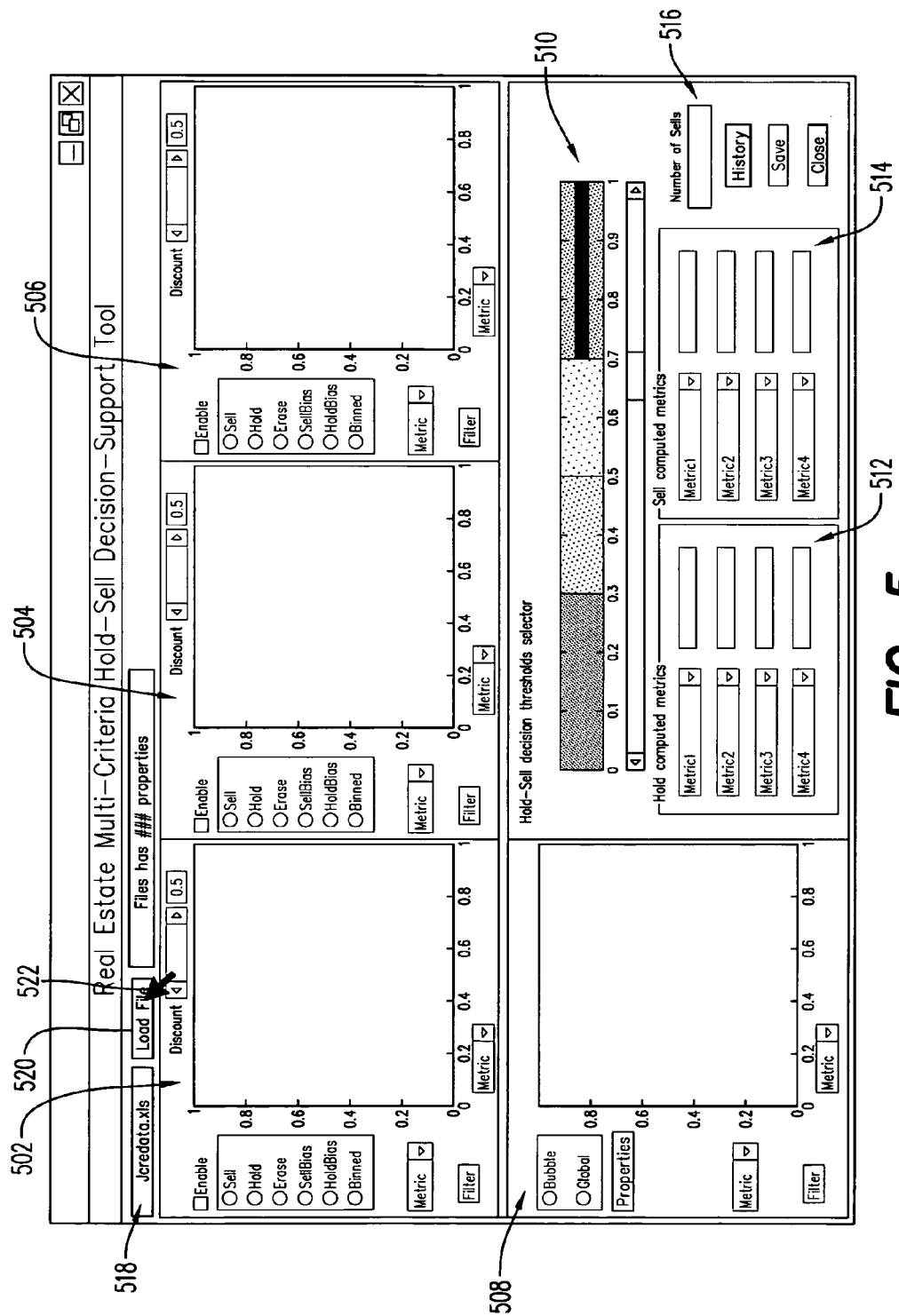
FIGS. 5-33 are screen displays that illustrate a graphical user interface (GUI) that may be provided in the computer systems of FIGS. 1 and 2 in connection with performing the process of FIGS. 3A and 3B.

FIG. 5 is a screen display provided on the computer system or user computer display screen as part of the GUI of the decision support tool. FIG. 5 presents the GUI screen display as the user may interact with it to accomplish loading of a portfolio file for the purpose of initiating data input to accomplish a portfolio hold/sell partition. The GUI screen display of FIG. 5 includes data input panels 502, 504, 506. It will be observed that the data input panels 502, 504, 506 are arrayed in a horizontal row in an upper portion of the GUI screen display. Further details of the data input panels 502, 504, 506 will be described below. As will be seen, the user is allowed to interact with the data input panels to enter/select hold/sell preferences with respect to individual properties included in the portfolio that is to be partitioned.

The GUI screen display also includes a results graphical display panel 508 which is positioned below the data input panel 502. Further details of the results graphical display panel will be described below. The results graphical display panel 508 graphically presents attributes of a portfolio partition recommendation generated by the decision support tool on the basis of preference data input by the user.

The GUI screen display further includes a threshold-setting slider bar 510, which extends below the data input panels 504, 506. As discussed further below, the user is permitted to interact with the threshold-setting slider bar 510 to set a preferred partition threshold. The threshold indicated with the threshold-setting slider bar 510 is used to split the portfolio based on partition scores assigned to the individual properties in the portfolio. Calculation and assignment of the partition scores is also described below.

In addition, the GUI screen display includes a group of numeric data display fields 512, 514, 516 which are provided (as will be seen) to present to the user statistics with respect to the portfolio partition recommended by the decision support tool based on the preference data input by the user. The numeric data display fields 512, 514 are below the threshold-setting slider bar 510 and the numeric data display field 516 is to the right of the numeric data display fields 514.

Most pertinent to the current stage of the process of FIGS. 3A and 3B are a text/numeric data entry field 518 and a "Load File" button 520. Both the text/numeric data entry field 518 and the "Load File" button 520 may be provided at the upper left-hand corner of the GUI screen display. The cursor 522 is shown in position to actuate the "Load File" button 520.

The text/numeric data entry field 518 is provided to allow the user to enter text/numeric data that identifies a data file that contains the relevant data for a real estate portfolio that is to be partitioned with the assistance of the decision support tool. Actuation of the "Load File" button 520 (by placing the cursor 522 on the button 520 and then clicking the mouse button—not separately shown but included in a conventional manner on the mouse 108 of the computer system 100 or on the mouse of the user computer 206, as the case may be) causes the data file identified in the field 518 to be loaded into the decision support tool for processing by the decision support tool.

Further features of the GUI screen display, including certain buttons provided at the lower-right corner of the GUI screen display, will be described below.

Figure 6:
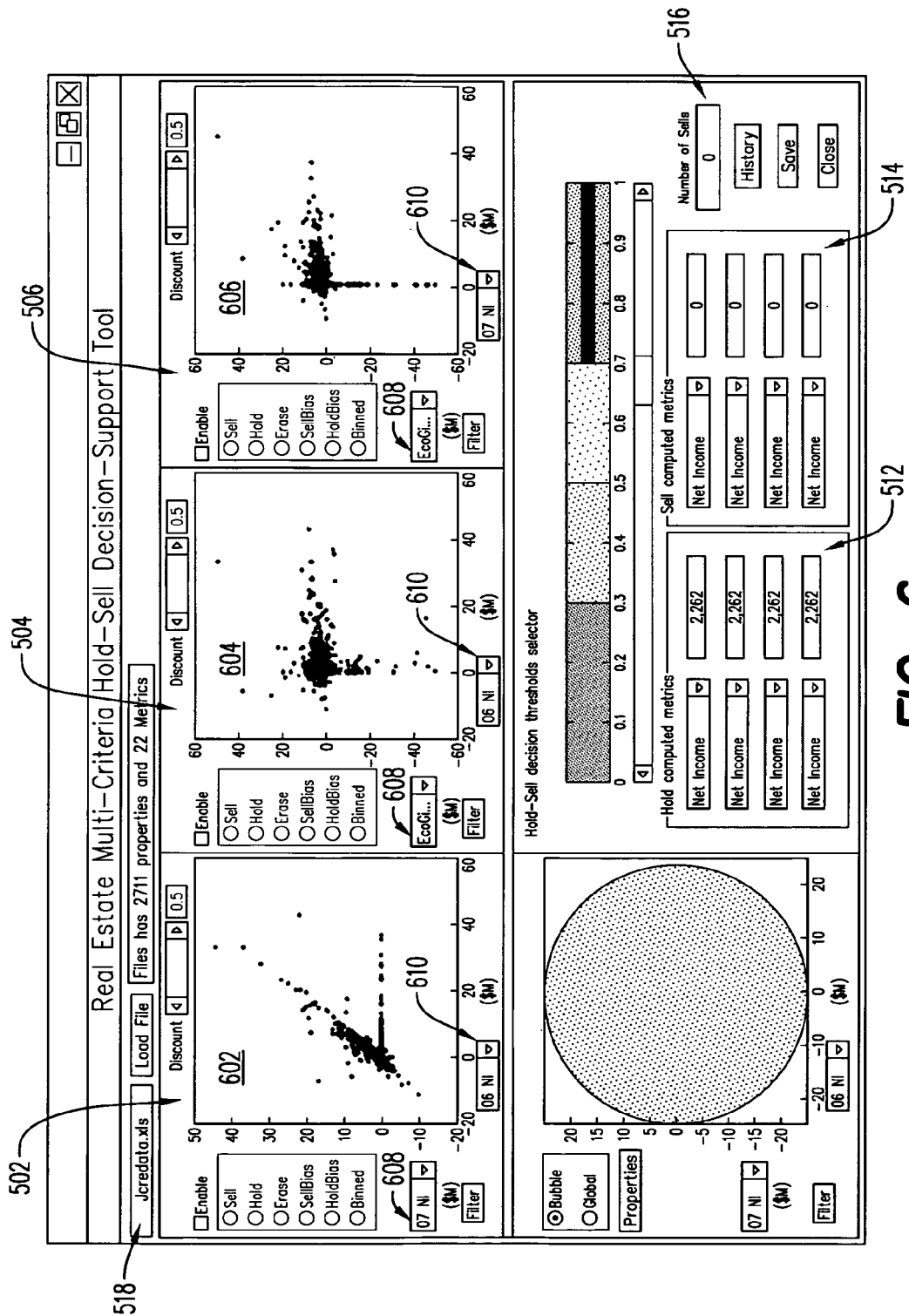

FIG. 6 shows an example of the appearance of the GUI screen display at a point in time after the portfolio data file has been loaded into the decision support tool. It will be noted that scatter-plot graphs 602, 604, 606 now appear, respectively, in the data input panels 502, 504, 506. The scatter-plot graphs each include a number of data points (in the examples shown, a considerable number of data points). Each data point represents a respective property in the portfolio that is to be partitioned.

In addition, each of the data input panels 502, 504, 506 includes a y-axis pull-down menu 608 and an x-axis pull-down menu 610, which are now available for manipulation by the user.

Figure 7:
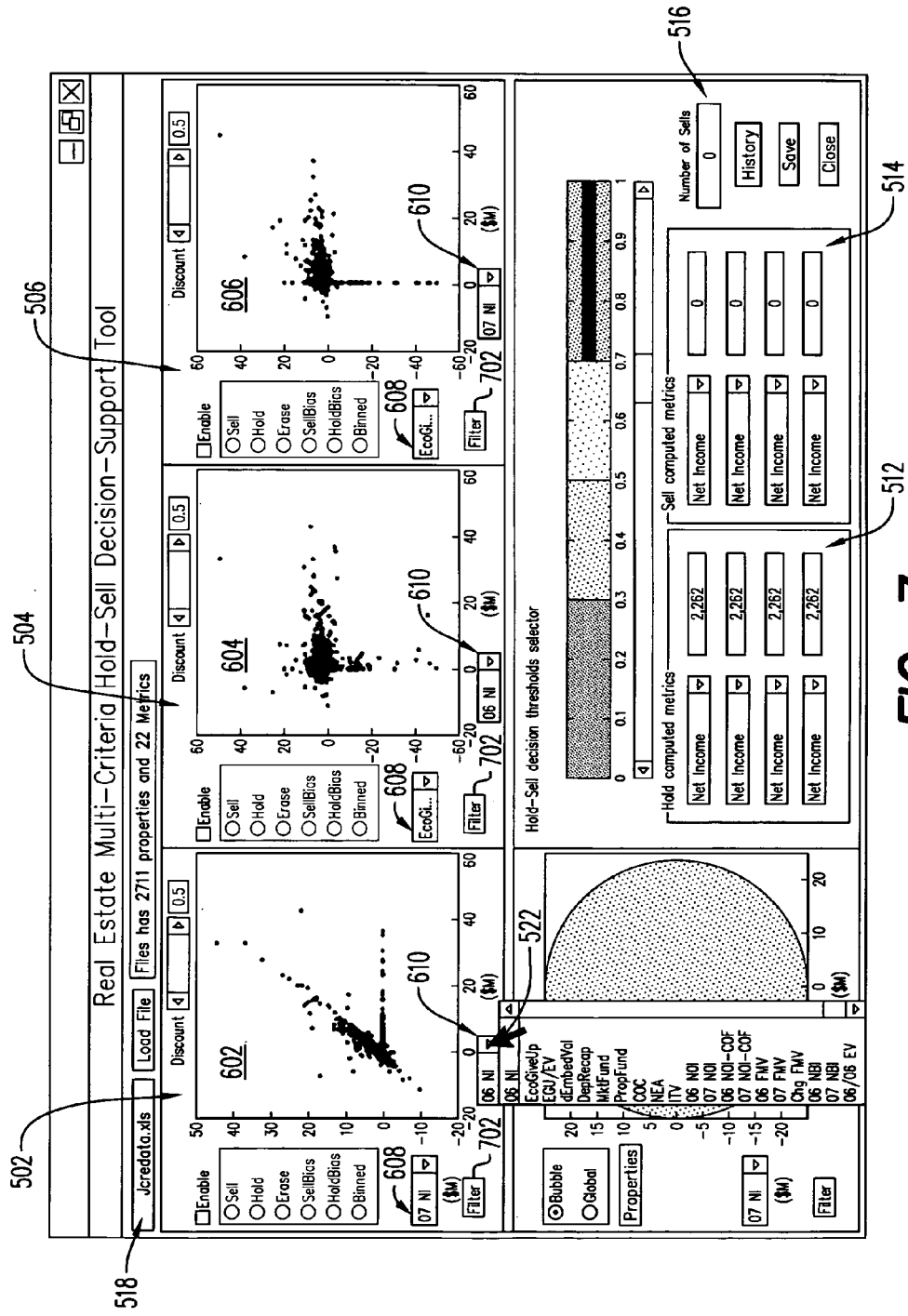

As seen from FIG. 7, the user may interact with the x-axis pull-down menu 610 of the data input panel 502 with the cursor 522 to select one parameter from a list of parameters included in the x-axis pull-down menu 610. The parameters each correspond to attributes, such as financial characteristics, of the properties which make up the portfolio that is to be partitioned. By selecting one of the parameters from the x-axis pull-down menu 610 of the data input panel 502, the user thereby selects the parameter to be represented by the x-axis of the scatter-plot graph 602 included in the data input panel 502. All of the pull-down menus 608, 610 of all of the data input panels 502, 504, 506 may include identical lists of parameters. The parameters may be the same as the financial parameters listed as columns in the spreadsheet of FIG. 4, and may be about ten in number in some embodiments.

Figure 8:
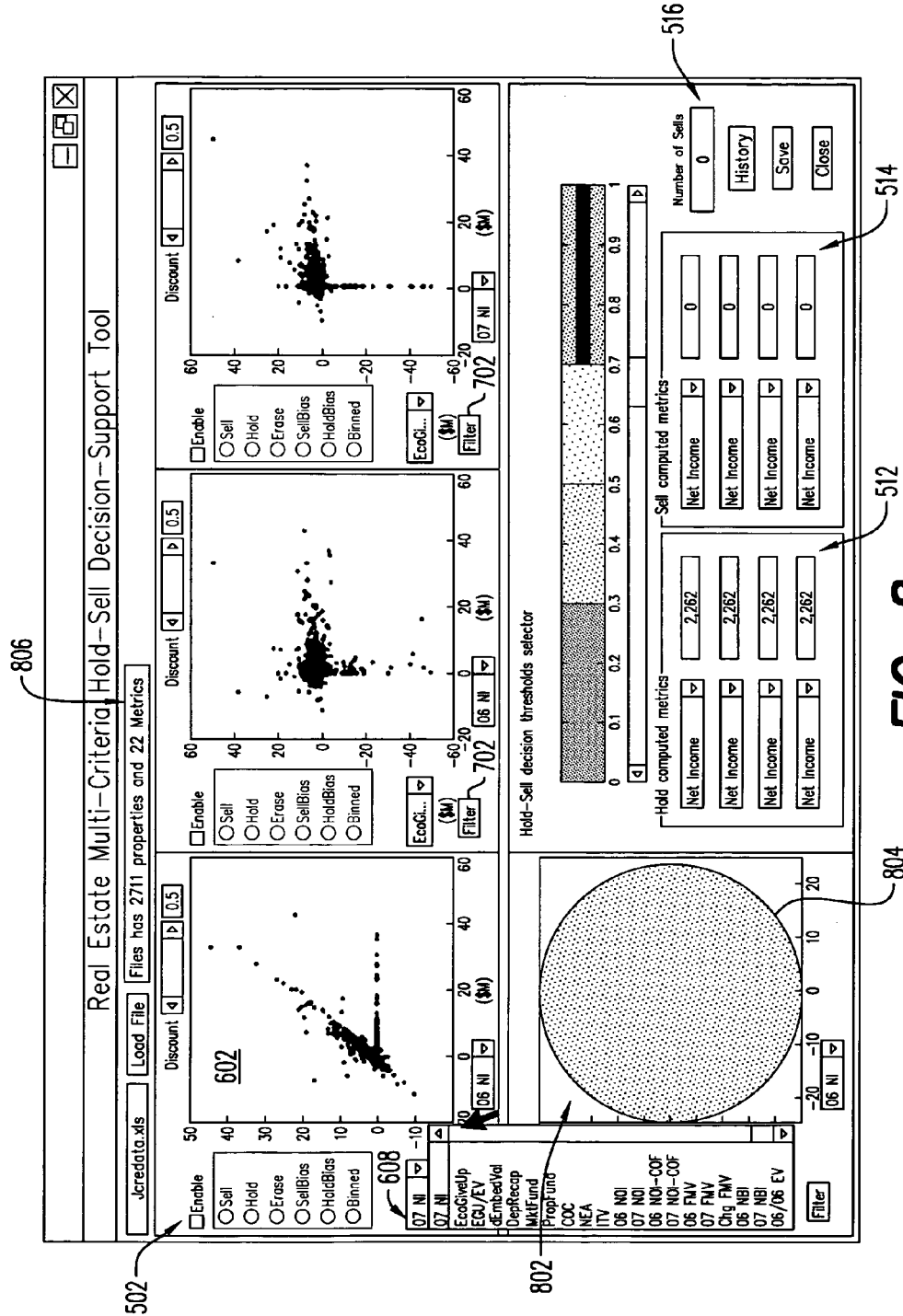

By selecting a parameter from the y-axis pull-down menu 608 (as in FIG. 8) of the data input panel 502, the user thereby selects the parameter selected from the menu 608 to be represented by the y-axis of the scatter plot graph 602 included in the data input panel 502. The resulting pair of selected parameters (preferably two different parameters are chosen respectively for the axes of a given one of the scatter-plot graphs) may function as decision criteria to be used by the user in defining his/her preferences for partitioning the portfolio. Accordingly, the two selected parameters define a two-dimensional projection in criteria space relative to the portfolio, it being understood that the criteria space is defined by the types of financial characteristics included for the properties in the portfolio database. The data points in the resulting scatter-plot graph are plotted according to the respective values of the two financial characteristics of the properties which correspond to the data points. (The process stage of defining a two-dimensional projection in criteria space is represented by block 304 in FIG. 3.)

The user may interact in a similar fashion with the y- and x-axis pull-down menus of the other two data input panels, to define the parameters to be represented by the axes of the scatter-plot graphs of the other two data input panels. It will be appreciated that the user thereby may define a different respective two-dimensional projection in criteria space for each of the other two data input panels.

In one practical embodiment of the invention, the number of parameters which define the criteria space (and are available for selection on each of the x- and y-axis pull-down menus) may be on the order of about 10 parameters. These parameters may represent various measures of yield, operating income, gain available by selling the property, risk, economic give-up, book value, market value, etc.

Referring again to FIG. 8, the results graphical display panel now (once a portfolio file has been loaded) displays a graphical representation of the current state of the partitioning process. In the particular example shown in FIG. 8, the graphical representation is a bubble graph 802. (Since the user has yet to enter any hold/sell preferences, all of the properties in the portfolio remain in the "hold" category. Accordingly, the bubble graph shows only a single bubble 804, which corresponds to the "Hold" category, or a "Hold Bias" results category to be described below.)

Also, the data display fields 512, 514, 516 are now populated, but also in such a manner as to indicate that all of the properties are still in the "hold" category. It will also be noted that a data file summary field 806 (near the top of the GUI screen display) is also now populated.

On a default basis, each of the scatter-plot graphs 602, 604, 606 displays data points for all of the properties in the portfolio (although potentially with quite a bit of overlapping of data points in cases where—such as the example illustrated—there are a large number of properties in the portfolio). However, in some embodiments, the user may be permitted to limit the data represented in the scatter-plots, on a panel-by-panel basis, to selected subsets of the portfolio. This function may be referred to as "filtering" the portfolio (the filtering function being selectable at decision block 306 in FIG. 3), and is initiated for a given panel by actuating the respective "Filter" button 702 (FIG. 7) in the panel. In addition to changing the corresponding display of data points, selection of a portfolio subset for a given panel also limits to that portfolio subset the effects of any hold/sell preferences input (in a manner described below) by using the panel with the filter function in place.

Figure 9:
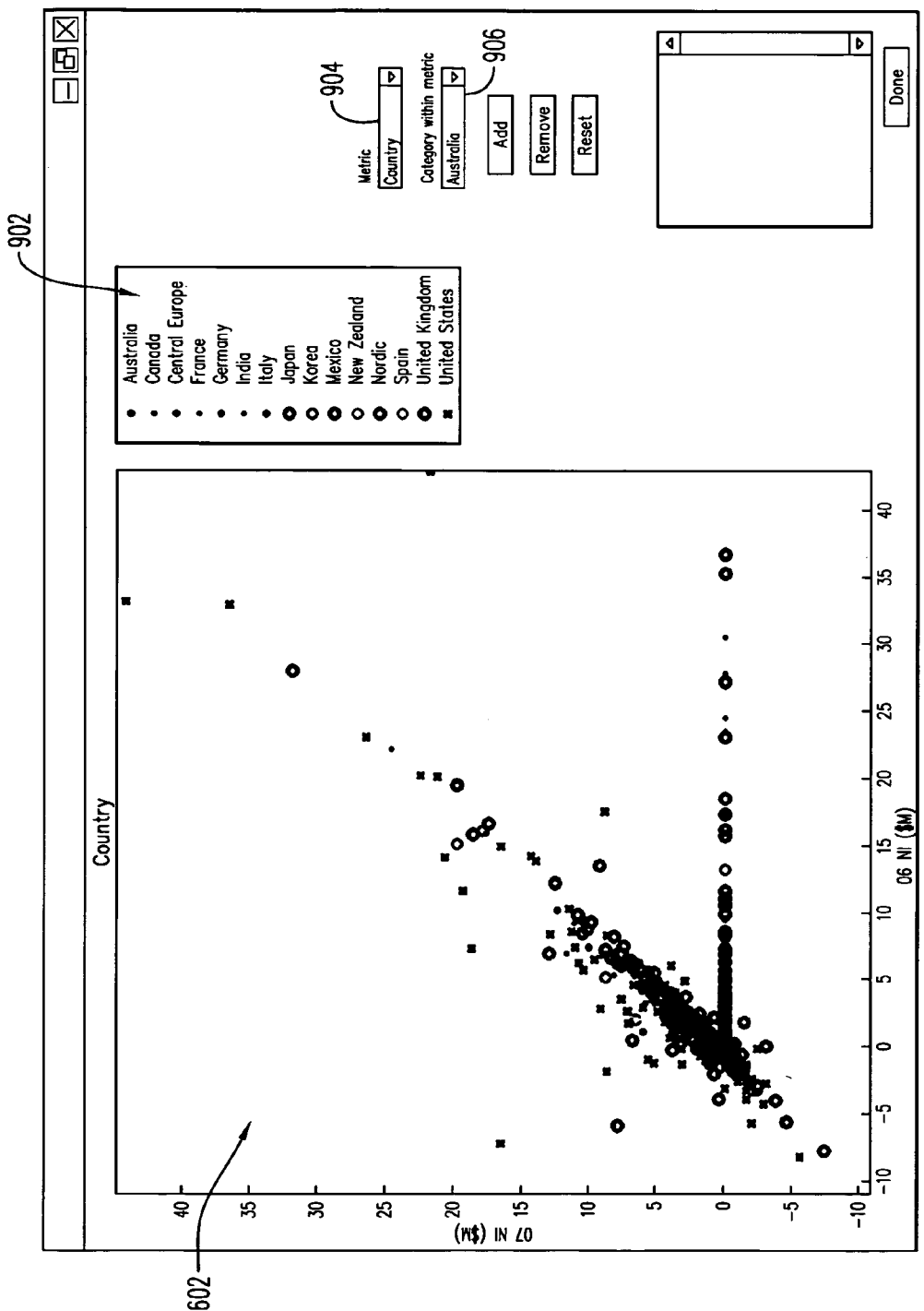
Figure 10:
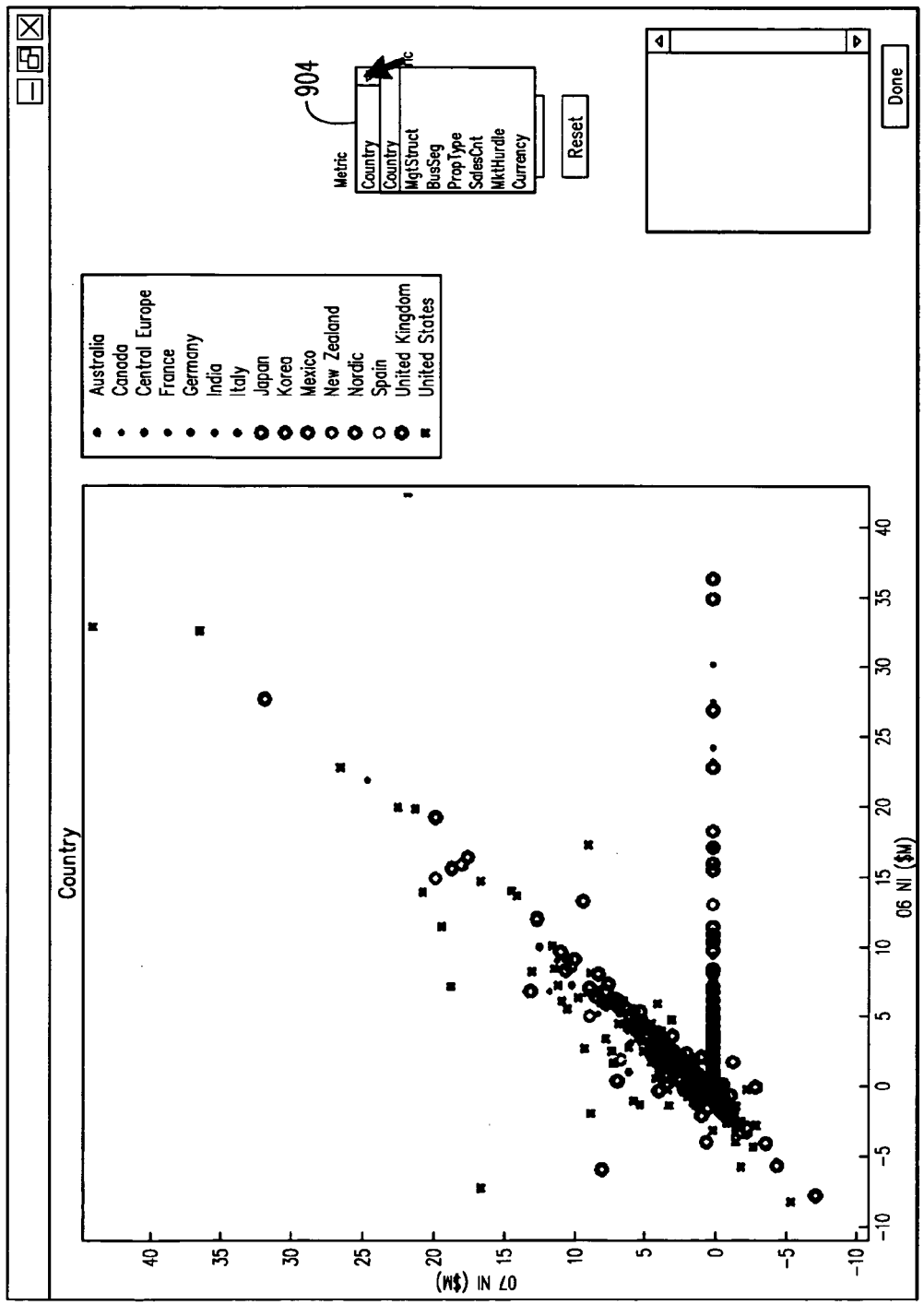

When the "Filter" button 702 is actuated in one of the data input panels 502, 504, 506, the GUI screen display in the format of FIGS. 5-8 is replaced by a GUI screen display in the format shown in FIG. 9. The GUI screen display of FIG. 9 represents a magnified presentation of the corresponding scatter-plot graph (assumed in this case to be scatter-plot graph 602) together with some further display elements related to the filtering function. In some embodiments, the default "filter" in fact is complete inclusion of the entire portfolio, but with the data points differentiated from each other according to country of location, by use of various data point shapes and colors, as represented by legend 902. Selection of categories of properties for inclusion in a subset of the portfolio to be displayed (and subjected to preference selection) in the corresponding data input panel may be accomplished by the user's interaction with a pair of pull-down menus 904 and 906. (Definition of a portfolio subset is represented as block 308 in FIG. 3) The pull-down menu 904 allows the user to select an attribute of the properties from which a "filtered-in" category is to be selected. For example, as seen from FIG. 10, the attributes selectable from menu 904 may include country of location, type of property, responsible business unit, manner of holding (wholly owned vs. joint venture), currency of the property location, etc.

Figure 12:
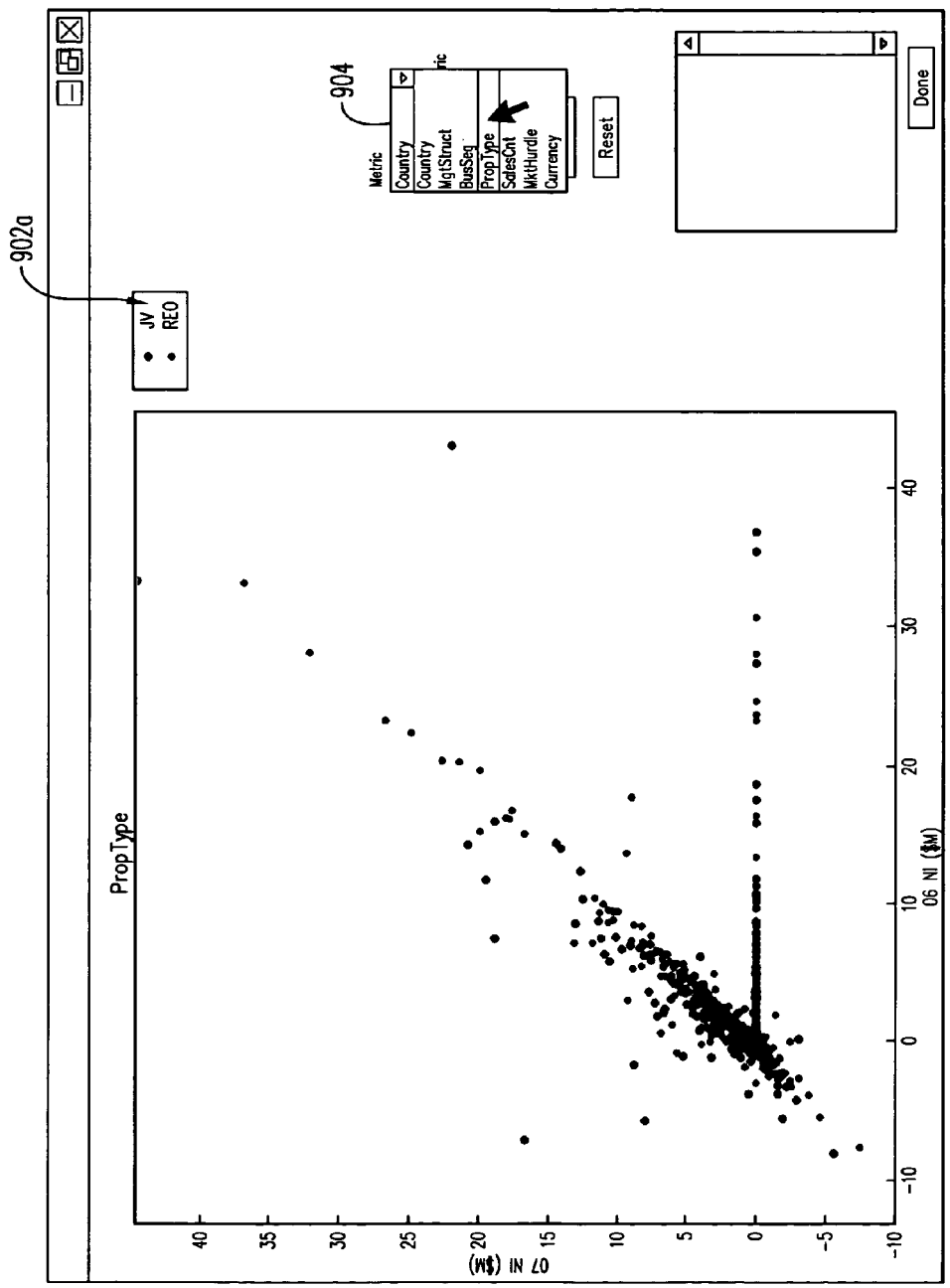

The options selectable from the second pull-down menu 906 depend on what option is currently selected from the first pull-down menu 904. For example, if the "Country" option is currently selected from the first pull-down menu 904, then the second pull-down menu 906 allows the user to select a particular country, as seen for example from FIGS. 9 and 13. As another example, if the "Property Type" option is currently selected from the first pull-down menu 904, then the second pull-down menu 906 allows the user to select either "REO" (meaning wholly owned) or "JV" (meaning "joint venture") as seen from FIG. 12.

The selection of a particular option from the first pull-down menu 904 may also change the symbols used to indicate the data points. Compare for example legend 902 in FIGS. 9 and 13, when the "Country" option is selected from menu 904, with legend 902a in FIGS. 12 and 14, which is presented when the "Property Type" option is selected from menu 904.

Figure 11:
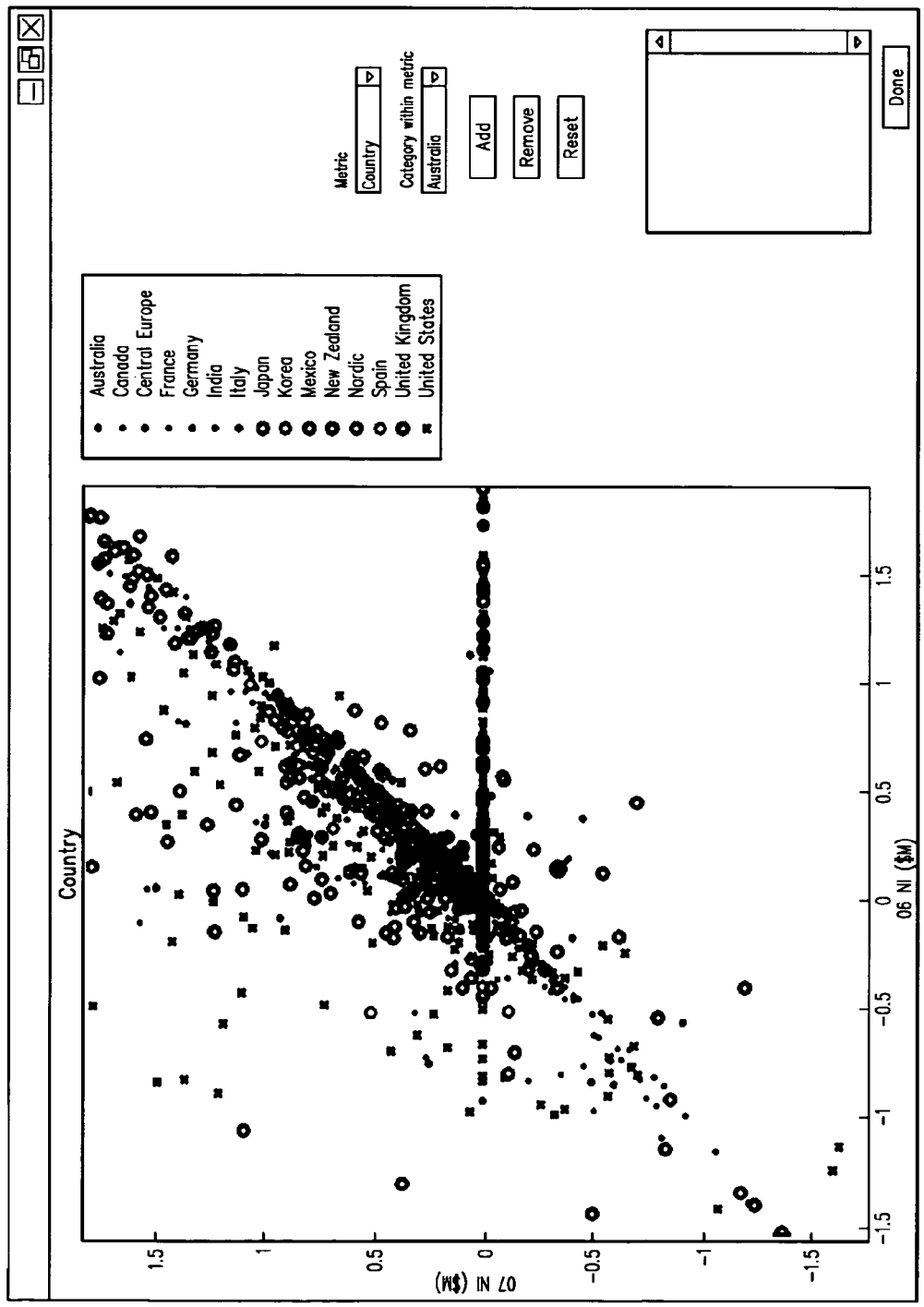

In some embodiments, the user may be allowed to "zoom in" on the scatter-plot graph by (e.g.) double clicking on the scatter-plot graph in the GUI display of FIG. 9, to produce the magnified scatter-plot graph 602a shown in FIG. 11.

Figure 13:
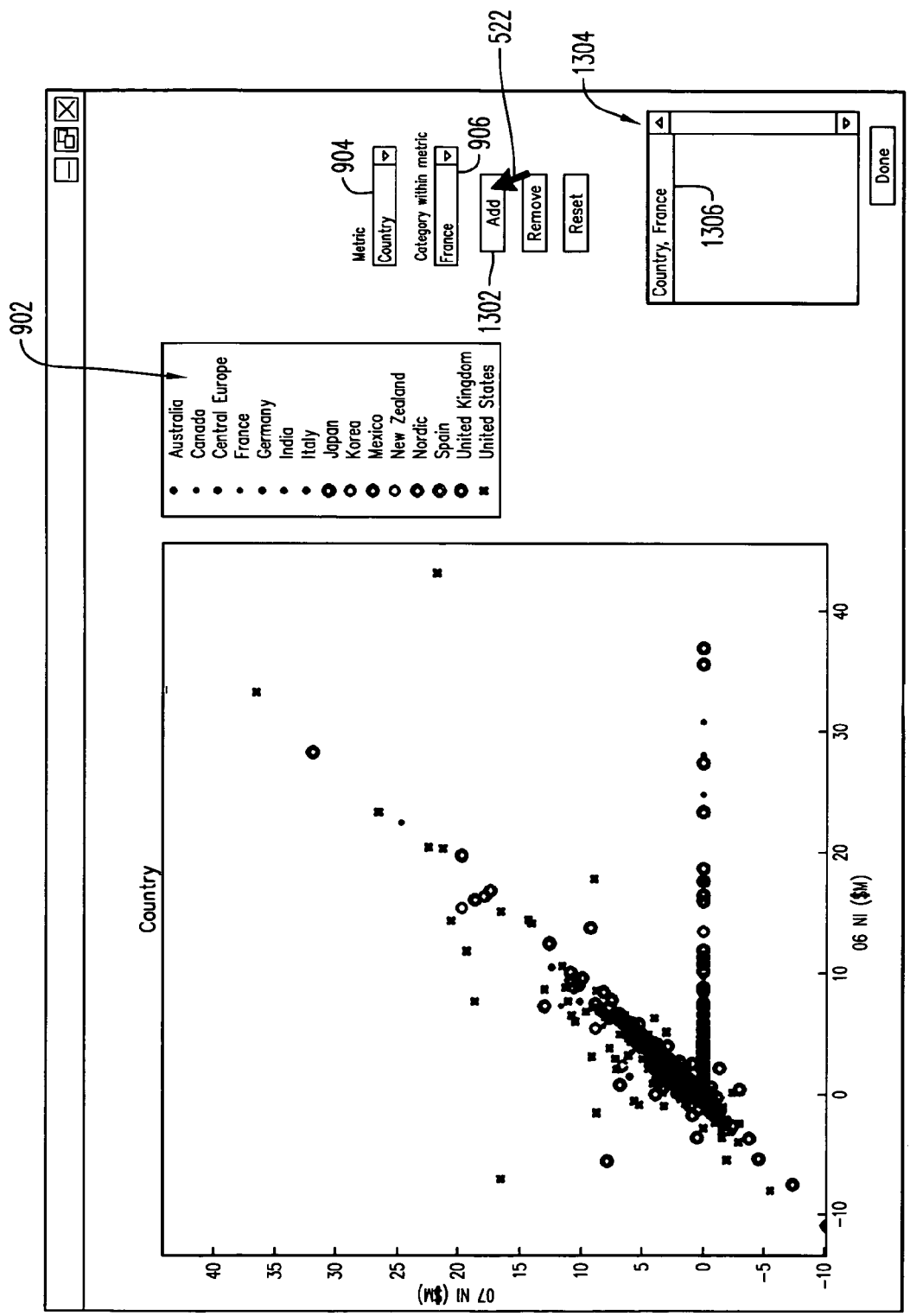
Figure 14:
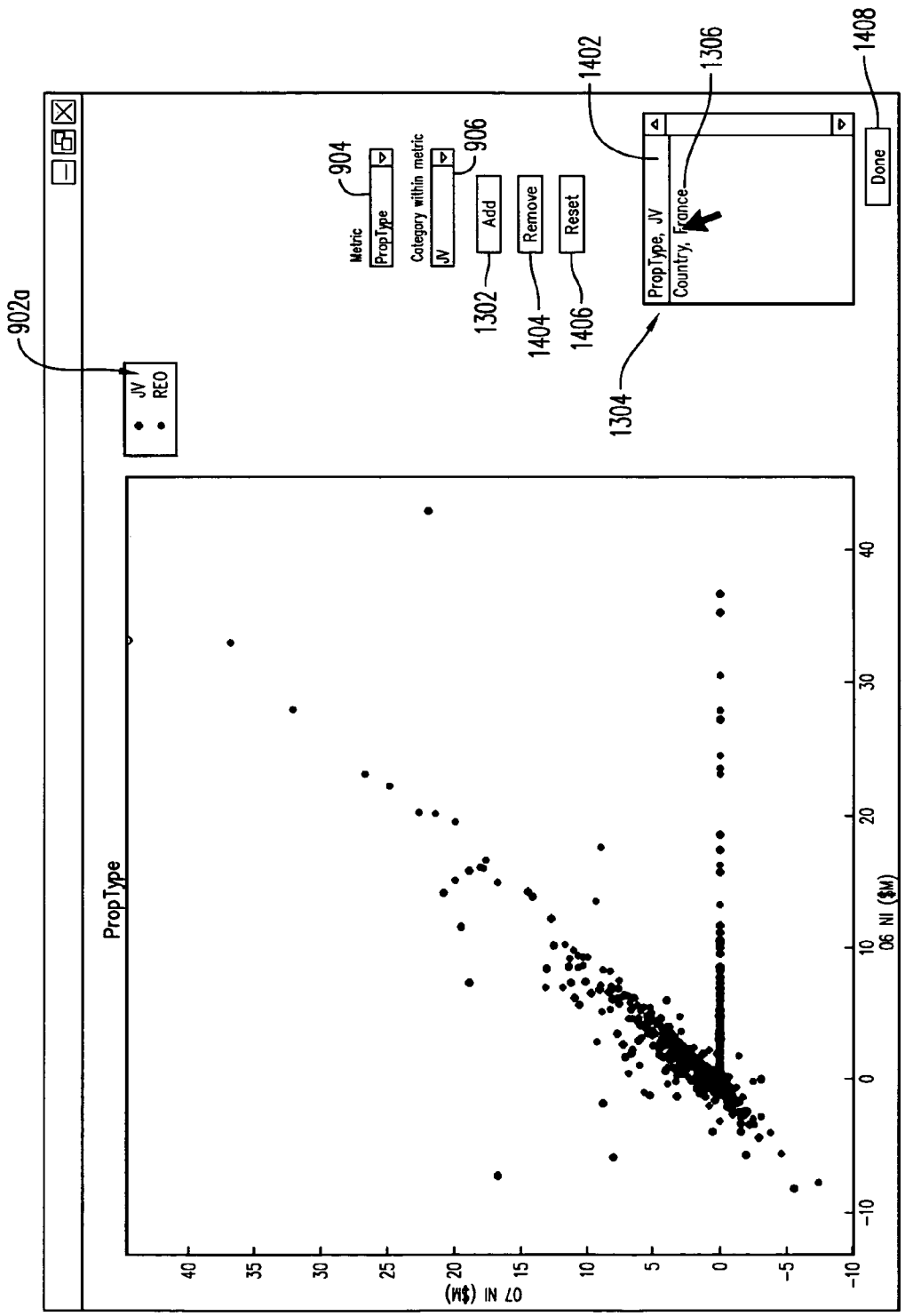

An example process for building a filter definition will now be described with reference to FIGS. 13 and 14. As illustrated in FIG. 13, actuating the "Add" button 1302 with the cursor 522 adds the currently selected option from the pull-down menu 904 to the filter definition, as presented in display field 1304. The filter definition may have more than one element. For example, if the filter definition already has the element "Country France" (reference numeral 1306) and the user wishes to add the further element "Property Type JV" (reference numeral 1402, FIG. 14), he/she may select the option "Property Type" from the first menu 904 and the option "JV" from the second menu 906, and may then actuate the "Add" button 1302. With the filter definition shown in FIG. 13 (in the display field 1304), the corresponding scatter-plot graph displays data points for, and the corresponding subset of the portfolio includes, all but only properties located in France. With the filter definition shown in FIG. 14 (in the display field 1304), the corresponding scatter-plot graph displays data points for, and the corresponding subset of the portfolio includes, all but only properties that are both located in France and held in the form of a joint venture.

An existing filter definition may be edited by use of the "Add" button 1302, as discussed above, and the "Remove" button 1404 (FIG. 14). In using the "Remove" button 1404, the user may highlight/select one of the constituent elements of the filter definition, as displayed in the display field 1304, and may then actuate the "Remove" button 1404, to remove the selected element from the filter definition.

The filter may be removed from the property population for the data input panel in question by actuating the reset button 1406.

Figure 15:
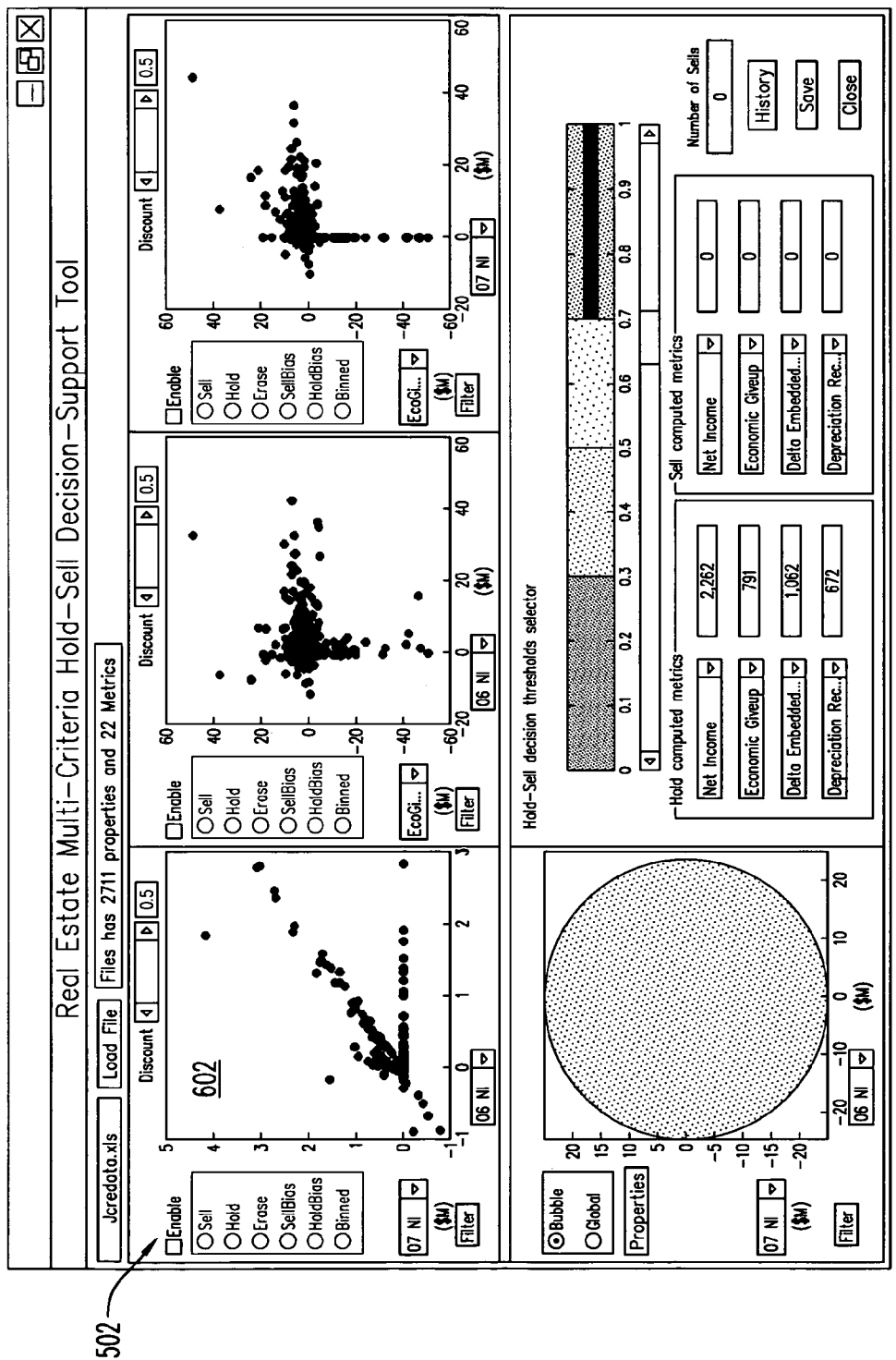

Upon actuation of the "Done" button 1408, the computer system/user computer again displays the main GUI screen display, as seen in FIG. 15, with the filter definition in effect for the data input panel (in this case assumed to be data input panel 502, scatter-plot graph 602) from which the filter definition screen display was accessed.

Figure 16:
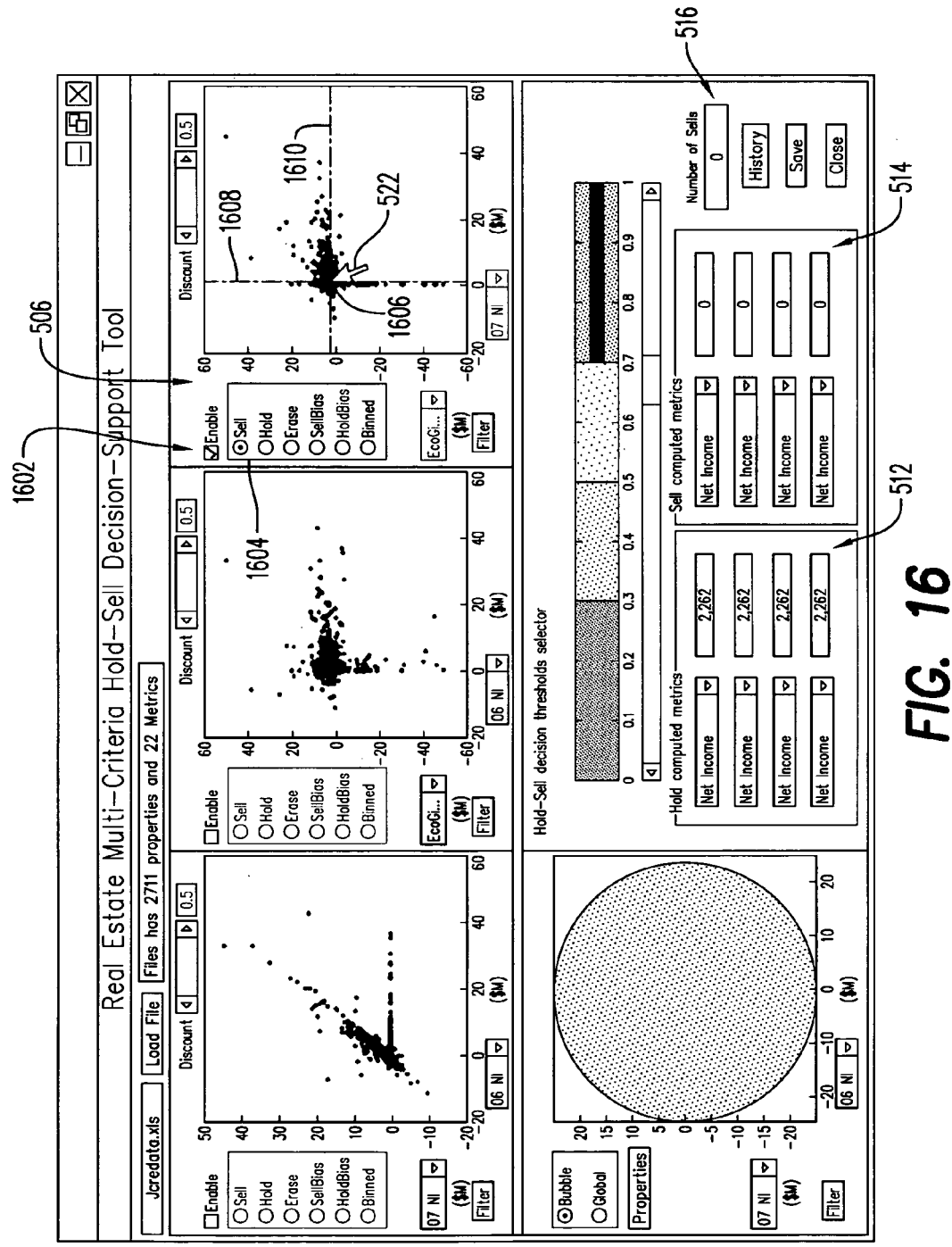

Referring again to FIG. 3A, and particularly block 310, it is the case, whether or not filtering is applied to a data input panel, that the user may interact with a data input panel by selecting a type of preference (in some embodiments "Sell", "Hold", "Sell_Bias" or "Hold_Bias") to be applied to a group of properties that is to be selected by interaction with the data input panel's scatter-plot graph. FIG. 16 shows that the "Enable" option 1602 has been checked with respect to data input panel 506. The checking of the "Enable" option 1602 causes the "Sell", "Hold", "Sell_Bias", "Hold_Bias" and "Binned" options (all located in region 1604 in data input panel 506) to become selectable by the user. (It will be noted that each of the other data input panels 502, 504 also has the options referred to in this paragraph.)

In the example shown in FIG. 16, it will be noted that the "Sell" option has been selected. Upon selection of one of the options "Sell", "Hold", "Sell_Bias" and "Hold-Bias", for one of the data input panels, the user is permitted to select a region (block 312 in FIG. 3A) in the scatter-plot graph for that data input panel. The significance of the selection of the region in the scatter plot graph is that the selected partitioning preference is applied to each property that is represented by a data point that is present in the selected region. The selection of a particular one of the options "Sell", "Hold", "Sell_Bias" and "Hold_Bias" also selects a pen color to be used in defining and indicating the selected region. Consequently, the region 1604 functions as a palette for selecting partitioning preference input pen colors.

In some embodiments, the user is allowed to select a region in the scatter-plot graph by defining a rectangle by indicating two diagonally opposite corners of the rectangle in the scatter-plot graph. In the example shown in FIG. 16, the user has manipulated the cursor 522 to position the origin 1606 of a set of dash-dot axes 1608, 1610 in the scatter-plot graph 606 of the data input panel 506. By clicking the mouse with the cursor 522/origin 1606 so positioned, the first corner of the selected rectangular region is indicated. These axes 1608, 1610 are in the pen color associated with the selected option (i.e., the "Sell" option in this case) Referring to FIG. 17, the cursor 522 is repositioned to position the origin 1702 of another set of dash-dot axes 1704, 1706 in the scatter-plot graph 606. Clicking the mouse with the cursor 522/origin 1702 so positioned effectively indicates the second corner of the selected rectangular region, so that the selected rectangular region 1708 is now completely defined, and is displayed in the pen color associated with the selected option (i.e., the "Sell" option in this case). With completion of the definition of the rectangular region 1708, the user has effectively indicated a partitioning preference with respect to some of the properties in the portfolio, and the computer system (or server, as the case may be) immediately translates the preference data into a proposed partition of the portfolio, subject to revision of the proposed partition upon entry of further preference data by the user. (The manner in which user-entered preference data is translated into a proposed partition will be described below.)

The current proposed partition is now reflected in the bubble graph 802 of the results graphical display panel 508. In particular, the bubble graph now includes a bubble 1710 in addition to the bubble 804, with the bubble 1710 graphically representing the portion of the portfolio currently assigned to the "Sell" category and the bubble 804 graphically representing the portion of the portfolio currently assigned to the "Hold Bias" subcategory of those properties not currently recommended for sale. Similarly, the data in the numeric data display fields 512, 514, 516 is updated to reflect the current proposed partition (compare with the data displayed in those fields in FIG. 6).

Figure 17:
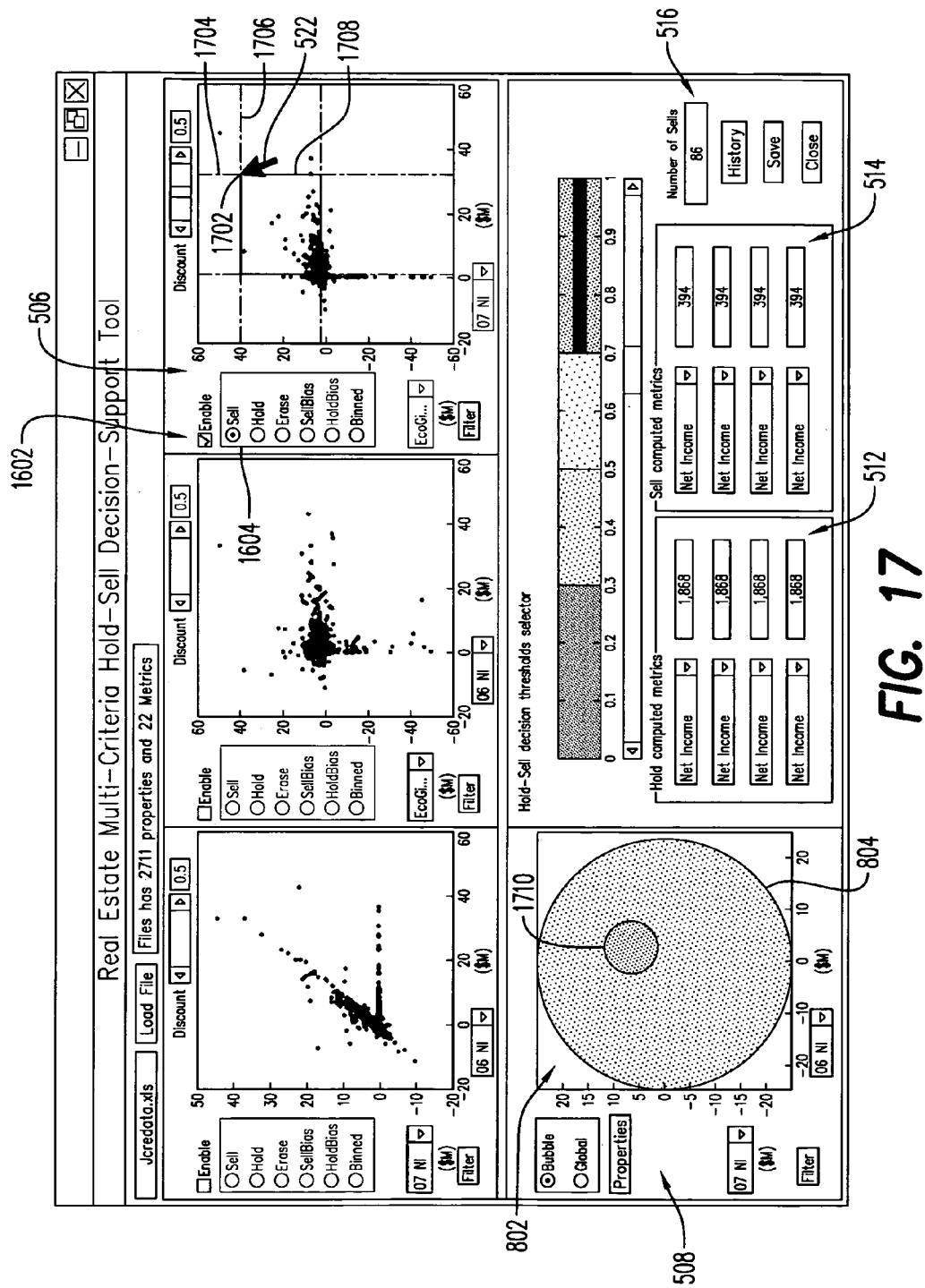
Figure 18:
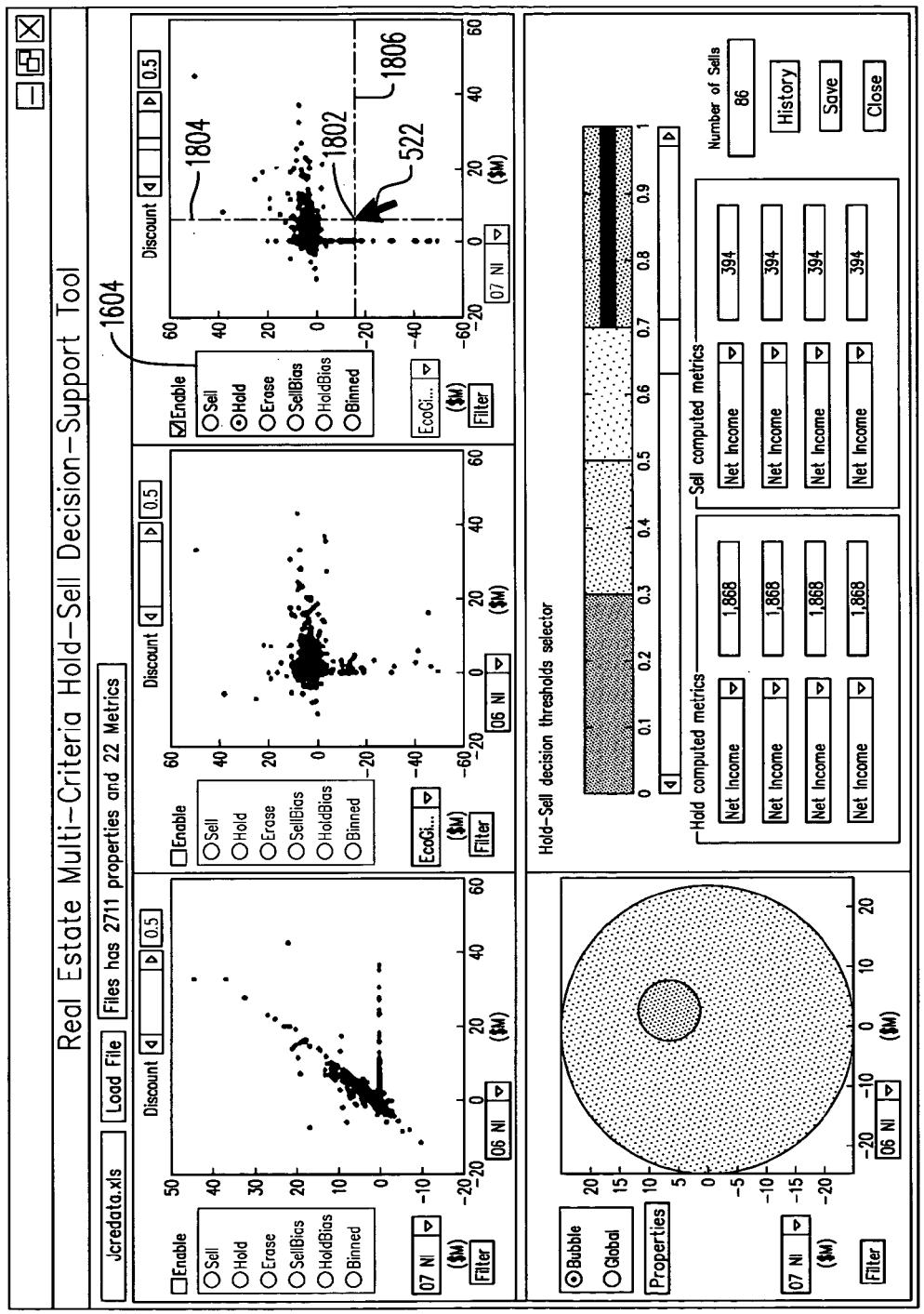
Figure 19:
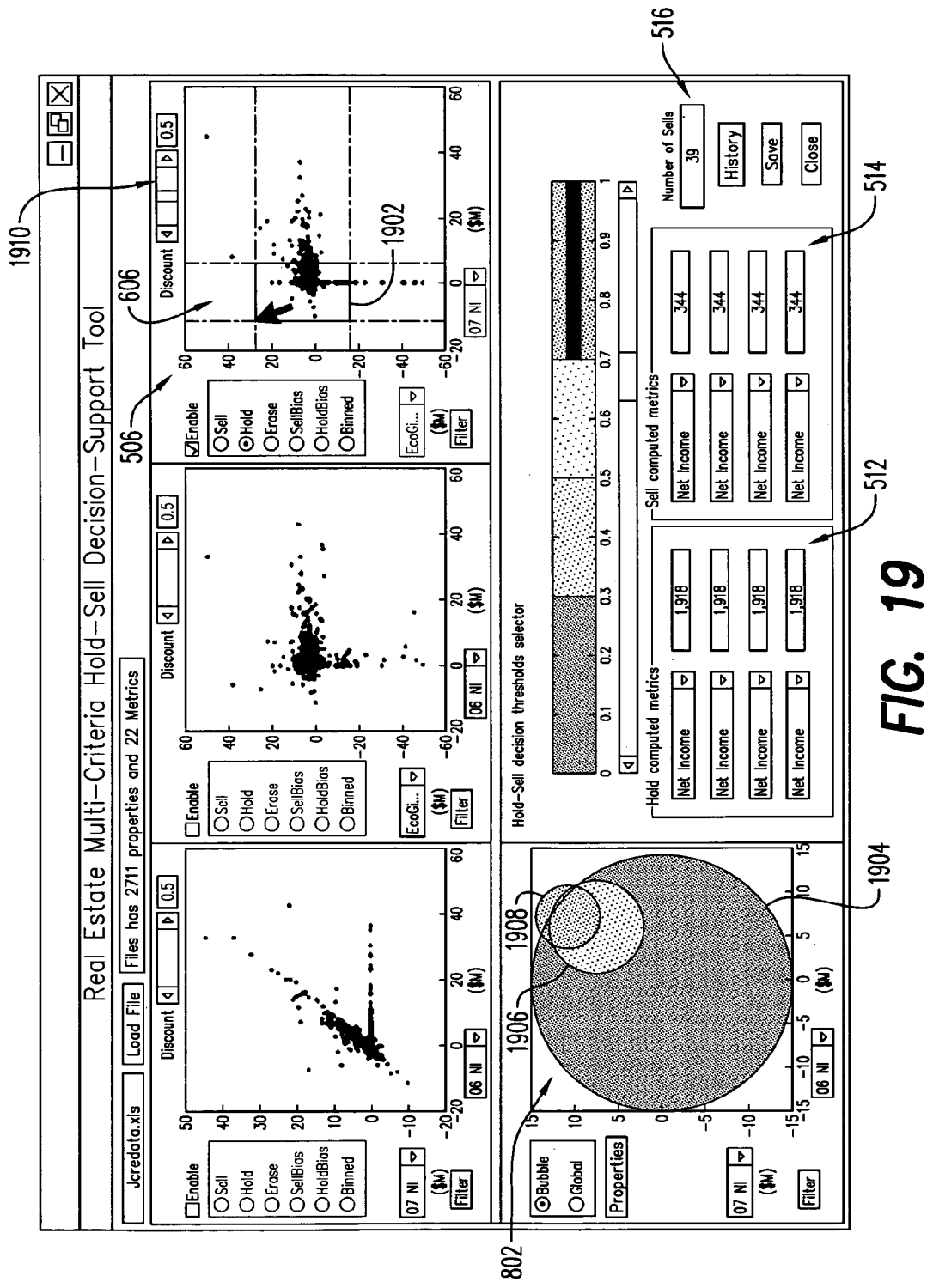

Referring to decision block 314 in FIG. 3A, the user is permitted to input another partition preference using the same data input panel/scatter-plot graph as was used in steps 310, 312. In the example illustrated, it is assumed that the user does so, as shown in FIGS. 18 and 19. Specifically, in FIG. 18, the user has selected the "Hold" option in region 1604, thereby selecting the pen color associated with that option (and different from the respective pen colors associated with the "Sell", "Hold_Bias" and "Sell_Bias" options). Moreover, the user has used the cursor 522 to position the origin 1802 of dash-dot axes 1804, 1806 to indicate the location of the first corner of the region to be selected for the "Hold" partitioning preference. The dash-dot axes 1804,1806 are displayed in the pen color associated with the "Hold" option. Similarly, in FIG. 19, the user indicates the location of the second corner of the rectangular region selected for application of the "Hold" partitioning preference, resulting in complete definition of the rectangular region 1902. The rectangular region 1902 is displayed in the pen color associated with the "Hold" option and applies the user's "Hold" partitioning preference to the properties which correspond to the data points displayed in the rectangular region 1902. The rectangular region 1708 that was displayed in FIG. 17 is no longer explicitly shown in FIGS. 18 and 19, but is reflected by displaying in the "Sell" pen color all of the data points that were present in the rectangular region 1708.

With the completion of the definition of the rectangular region 1902, the user has entered additional partitioning preference data, which is immediately reflected by the computer system/server in an updated proposed partition of the portfolio. The changed partition is reflected by changes (compare FIG. 19 with FIG. 17) in the bubble graph 802 (now displaying bubbles 1904, 1906, 1908) and changes in the data displayed in numerical data display fields 512, 514, 516.

After entering one or more partitioning preferences with respect to a particular data input panel, the user may set a weighting or discount factor to be applied to the partitioning preferences entered with the data input panel in question. This may be done by the user interacting with the projection weight slide bar 1910 for the data input panel in question (as indicated at block 316 in FIG. 3A). However, for purposes of the example illustrated in FIGS. 6-19 and subsequent drawings, it will be assumed that the user does not interact with the slider bar 1910 of the data input panel 506, and accordingly the "projection weight" to be applied to the preference data input via scatter-plot graph 606 of panel 506 remains at the default value of "0.5". An example of interaction with a projection weight slide bar will be described below in connection with a different one of the data input panels. It will be noted that each of the data input panels has its own slider bar.

Figure 20:
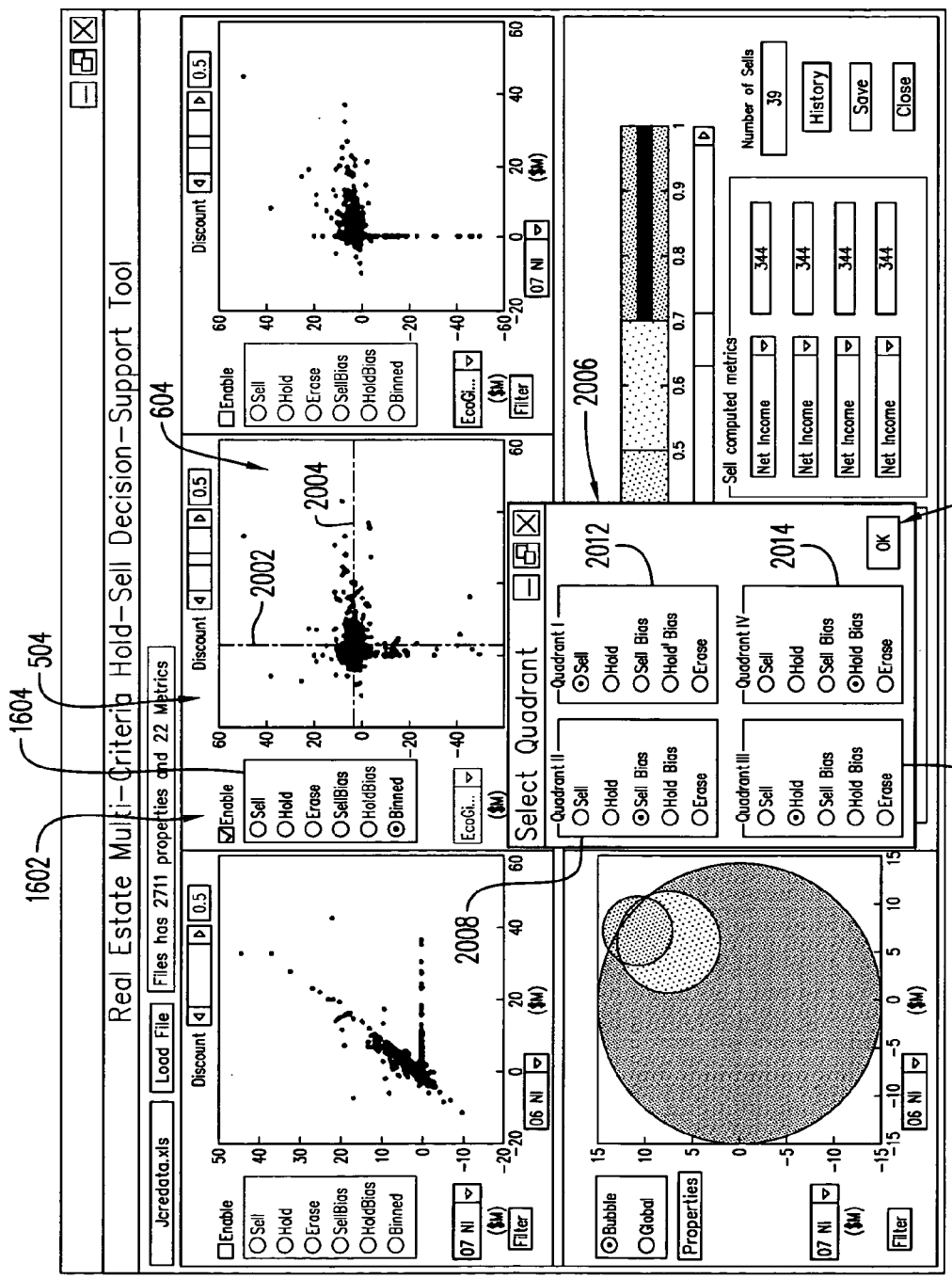
Figure 21:
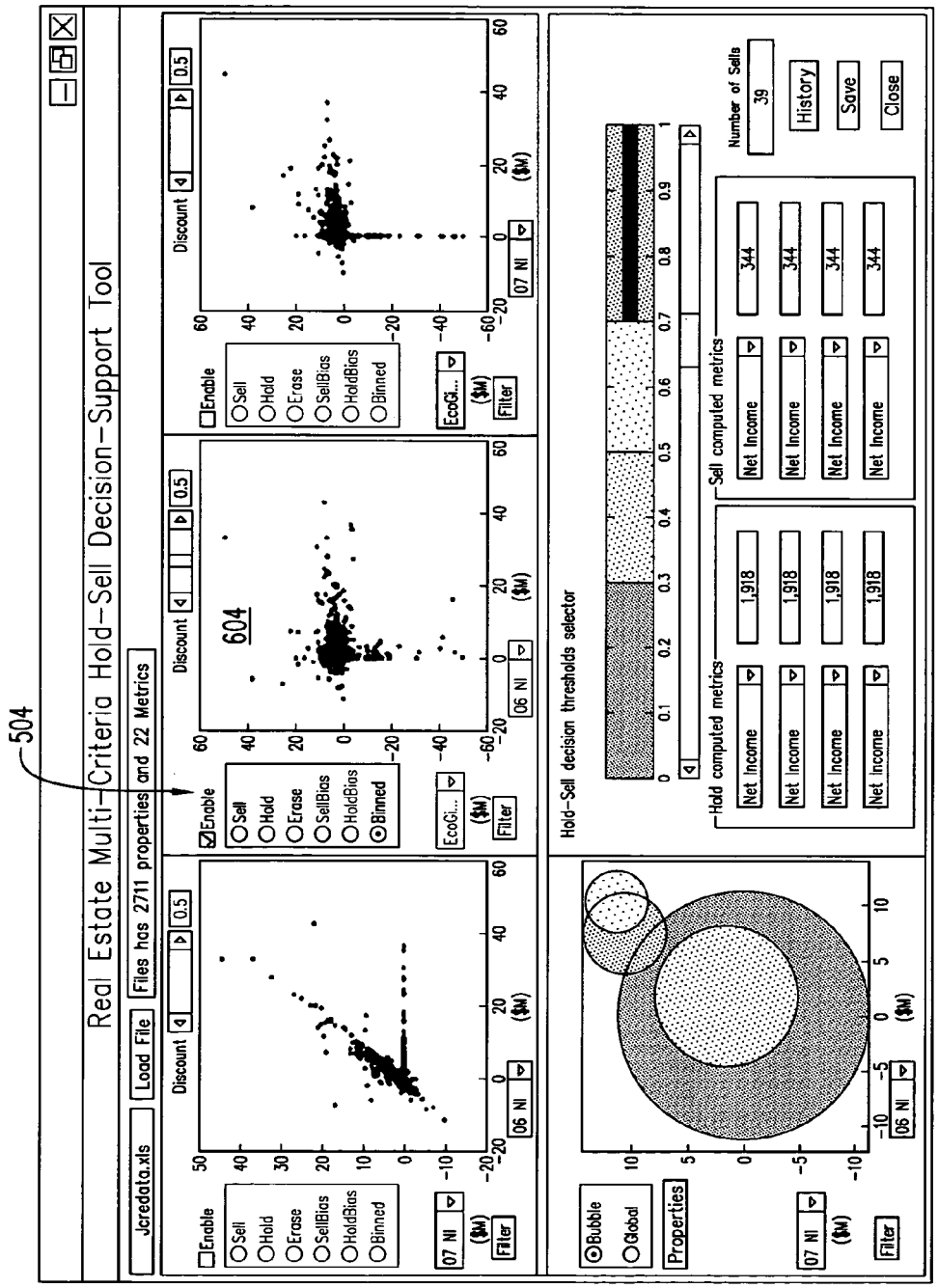
Figure 22:
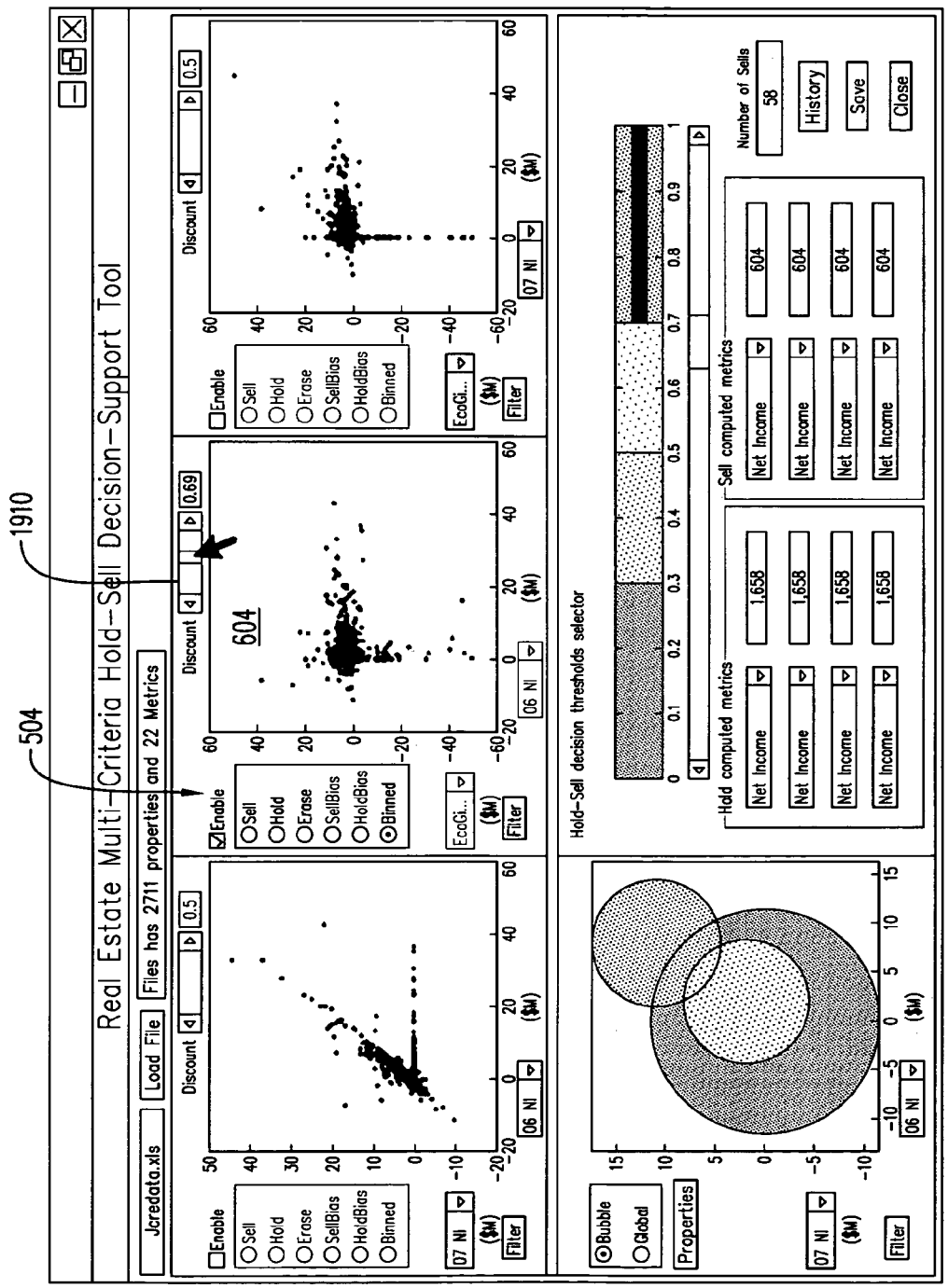
Figure 23:
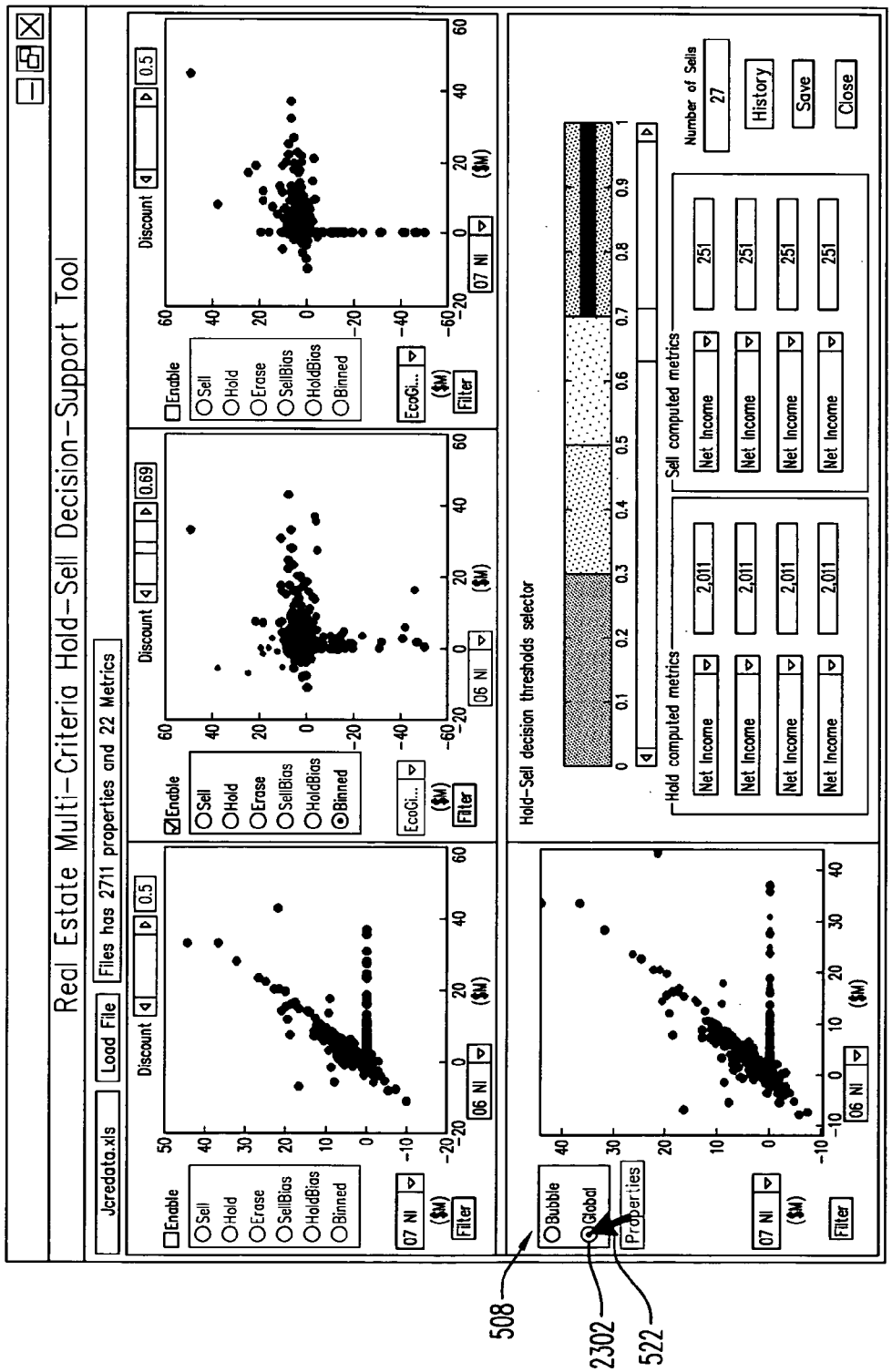

Following setting of the projection weight factor (either by default or by user input) at block 316 in FIG. 3A, it is next determined at 318 whether the user wishes to input additional partitioning preference data with respect to a different two-dimensional projection of the portfolio in criteria space. This may be done, for example, by interacting with a different one of the data input panels. FIGS. 20-22 illustrate interaction with data input panel 504 and its scatter-plot graph 604 and also illustrate operation of the "Binned" option referred to above and available for selection in the regions 1604 of each of the data input panels.

FIG. 20 shows the "Enable" option 1602 and the "Binned" option selected for the data input panel 504. The purpose of the "Binned" option is to divide the scatter-plot graph for the corresponding data input panel into four quadrants, each of which may be painted with a respective pen color. By using the "Binned" option the user is allowed to quickly and conveniently apply a respective partitioning preference with respect to every data point displayed in the scatter-plot graph for the corresponding data input panel. The four quadrants are defined by a pair of dash-dot axes 2002, 2004. (In this particular example, the origin of the axes 2002, 2004 happens to coincide with the origin of the scatter plot graph 604. However, in some embodiments, the user may be permitted to "drag" the origin of the axes 2002, 2004 to re-position the origin of the axes 2002, 2004 relative to the origin of the scatter-plot graph.)

Pop-up 2006 appears upon selection of the "Binned" option for a given data input panel. The pop-up 2006 includes four palette regions 2008, 2010, 2012 and 2014. Each of the palette regions is provided to allow the user to select a partitioning preference (e.g., "Hold", "Sell", "Hold_Bias" or "Sell_Bias") for data points in a corresponding one of the quadrants in the scatter-plot graph of the data input panel in question. The palette regions 2008, 2010, 2012, 2014 essentially are quadrants of the pop-up 2006, with each of the palette regions controlling assignment of a respective partitioning preference to the corresponding quadrant of the scatter-plot graph. That is, palette region 2008 (being the upper left quadrant of pop-up 2006) controls assignment of a partitioning preference to the upper left quadrant of the scatter-plot graph; palette region 2010 (being the lower left quadrant of the pop-up 2006) controls assignment of a partitioning preference to the lower left quadrant of the scatter-plot graph; palette region 2012 (being the upper right quadrant of the pop-up 2006) controls assignment of a partitioning preference to the upper right quadrant of the scatter-plot graph; and palette region 2014 (being the lower right quadrant of the pop-up 2006) controls assignment of a partitioning preference to the lower right quadrant of the scatter-plot graph. Selection of one of the partitioning preference options in a palette region 2008, 2010, 2012, 2014 also selects the corresponding pen color for the quadrant in question.

Clicking the "ok" button 2016 in the pop-up 2006 effects entry of the partitioning preferences. The resulting display is shown in FIG. 21. The axes are now longer visible in the scatter-plot graph 604, but each data point in a given quadrant is now colored with the pen color that has been selected for the quadrant. (In some embodiments, the user is not required to select a partitioning preference for all of the quadrants.) Selection of a respective pen color/partitioning preference option for a quadrant of the scatter-plot graph effectively assigns that partitioning preference option to the properties which correspond to each data point displayed in that quadrant. In some embodiments, the same partitioning preference may be selected, at the user's option, for two or more of the quadrants.

FIG. 22 illustrates interaction with the slider bar 1910 for the data input panel 504 to change the weight given by the computer system/server with respect to the partitioning preferences entered by the user via the data input panel 504. In this particular example, the user manipulates the slider bar 1910 to increase the projection weight factor above the default value of 0.5. In preferred embodiments, the projection weight is variable in the range [0,1].

As illustrated by FIGS. 23-30, the user may interact with the results display portions of the GUI screen display to change the manner and/or the results data sets indicated as results of the currently recommended portfolio partition. For example, as seen from FIG. 23, the user may utilize the cursor 522 to select the "Global" option 2302 of the results graphical display panel 508. As a consequence of selecting the "Global" option 2302, the bubble graph seen in previous drawings is replaced with a scatter-plot graph 2304. In the scatter-plot graph 2304, each data point is color-coded to indicate how the corresponding property is categorized according to the currently recommended partition of the portfolio.

Figure 24:
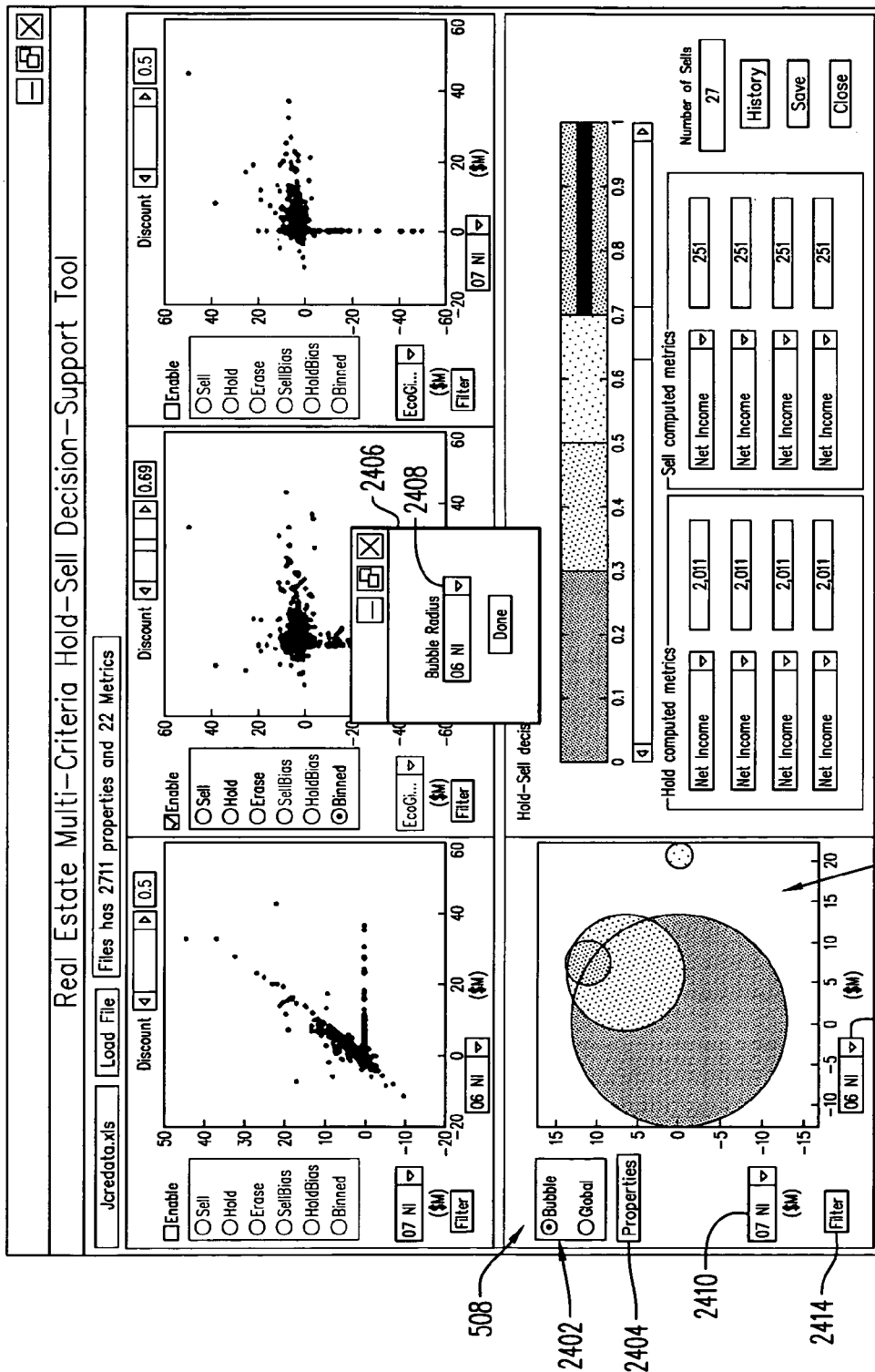

The user may switch the results graphical display panel 508 back to the bubble graph 802, by selecting the "Bubble" option 2402 (FIG. 24). At a time when the bubble graph 802 is selected, the user may actuate "Properties" button 2404, to cause pop-up 2406 to appear. Pop-up 2406 includes a pull-down menu 2408. The pull-down menu 2408 may have the same selectable options as the pull-down menus 608, 610 included in the data input panels and discussed above in connection (e.g.) with FIG. 6. The pull-down menu 2408 thus may include as selectable options the various financial parameters that are applicable to the properties in the portfolio. The particular parameter selected via the pull-down menu 2408 is the parameter used to generate the radius for each of the bubbles displayed in the bubble graph 802. Each bubble represents aggregate data for a category of properties as the property categories are established in connection with a proposed partition of the portfolio.

The center of each bubble is the aggregate center of the properties in a given category as determined for the two-dimensional parameter space defined by the parameters selected with the y-axis pull-down menu 2410 and the x-axis pull-down menu 2412 of the results graphical display panel 508. These pull-down menus may be the same as the pull-down menus 608, 610, 2408 referred to above.

The radius of each bubble is the aggregate, for the properties in the corresponding partition category, of the parameter selected from the pull-down menu 2408.

In some embodiments, there may be up to four bubbles displayed in the bubble graph, corresponding to four partition categories. Each of the four bubbles may be displayed in a different color. The four corresponding categories may be: (1) "Sell", (2) the "Sell Bias" subcategory of the properties not (currently) recommended for sale, (3) the "Hold Bias" subcategory of the properties not currently recommended for sale, and (4) the "Hold" (i.e., "strong hold") subcategory of the properties not currently recommended for sale. As will be seen these four categories may correspond to different respective ranges of a partition score that is assigned to each of the properties of the portfolio. As will also be seen, assignment of the partition scores is based on calculations from the partitioning preference data input by the user.

Figure 25:
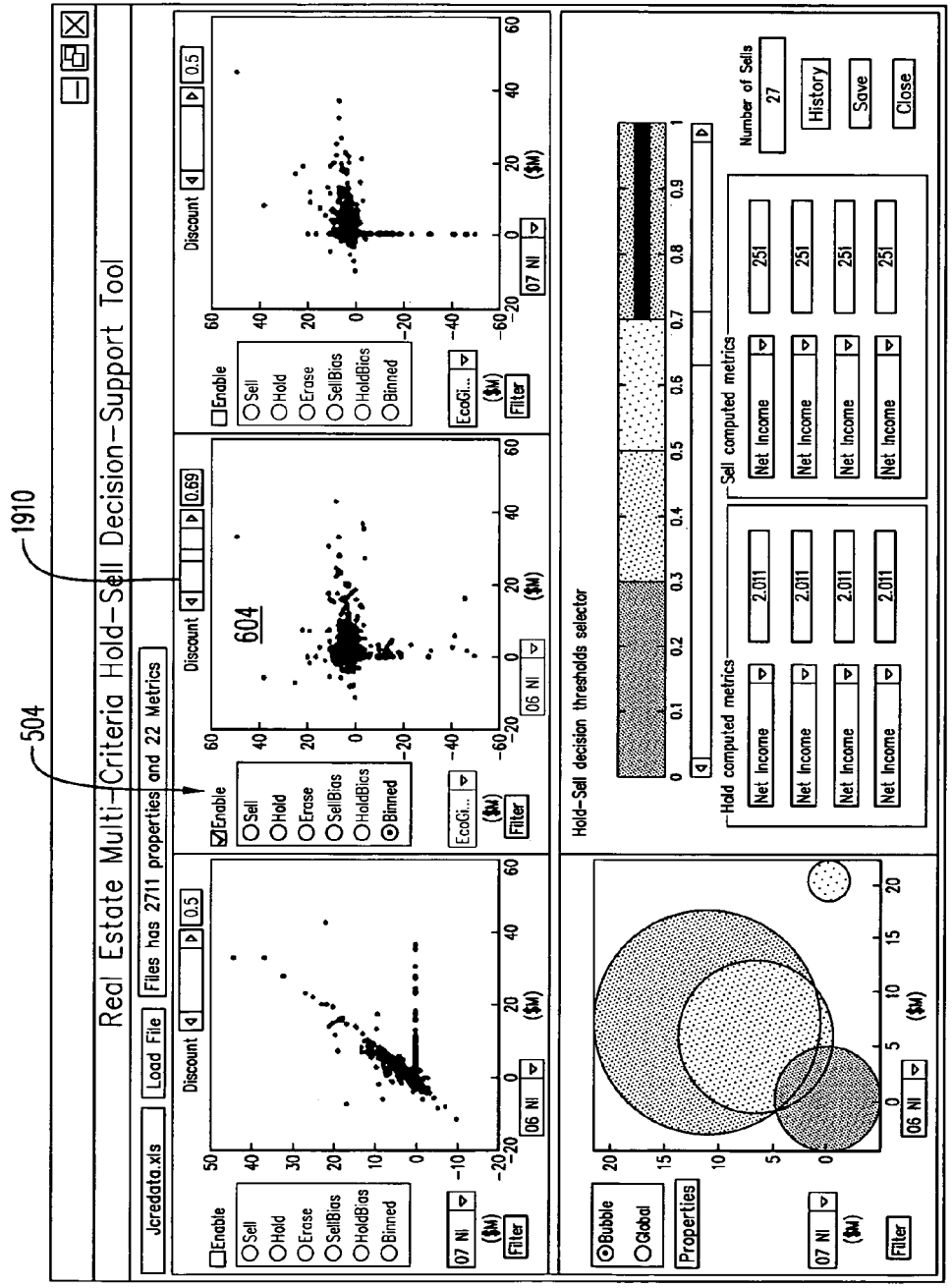

If the bubble graph shown in FIG. 25 is compared with the bubble graph shown in FIG. 24, it will be recognized how changing the parameter reflected by the radius of the bubbles causes changes in the appearance of the bubble graph.

Figure 26:
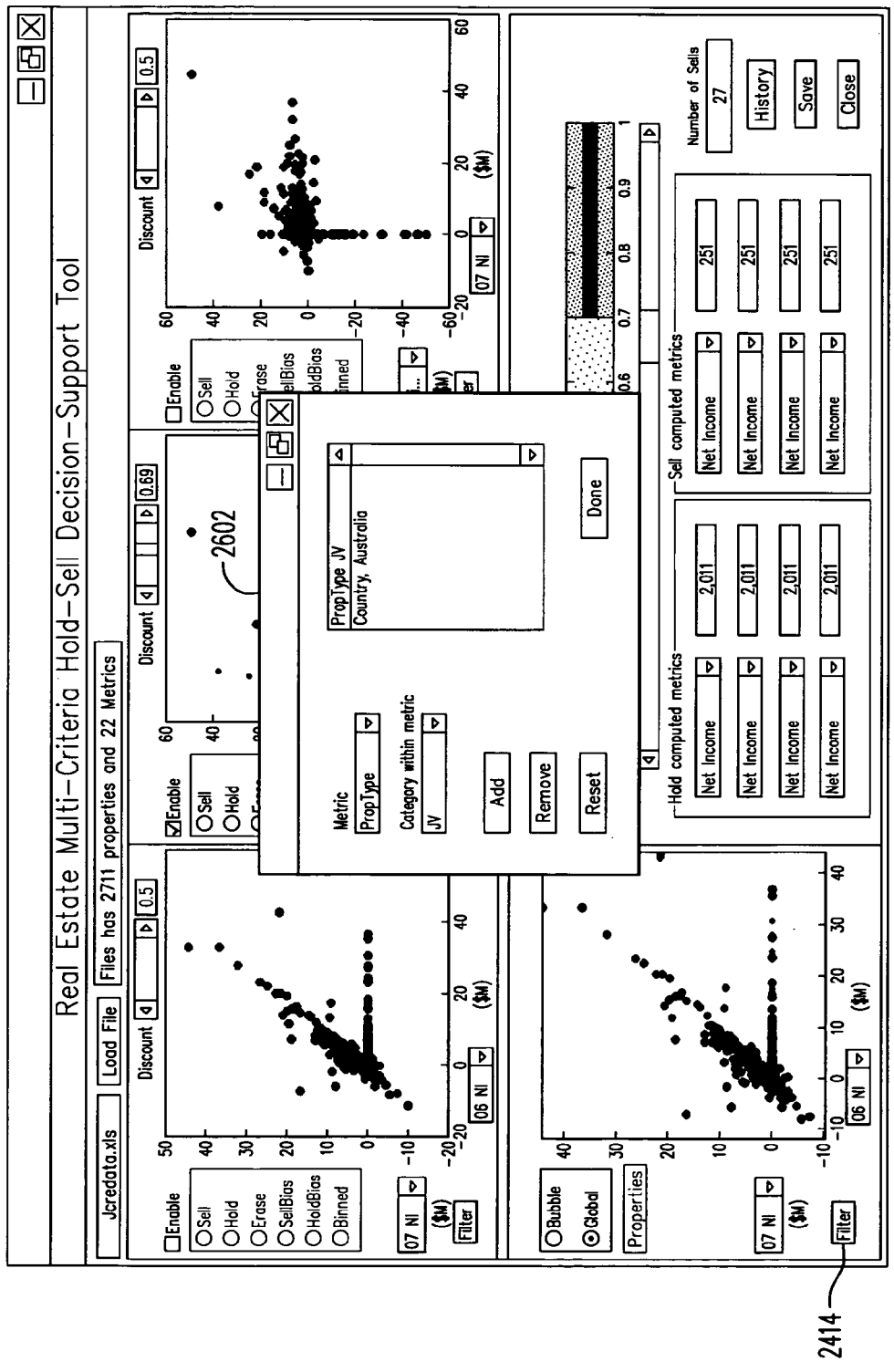
Figure 27:
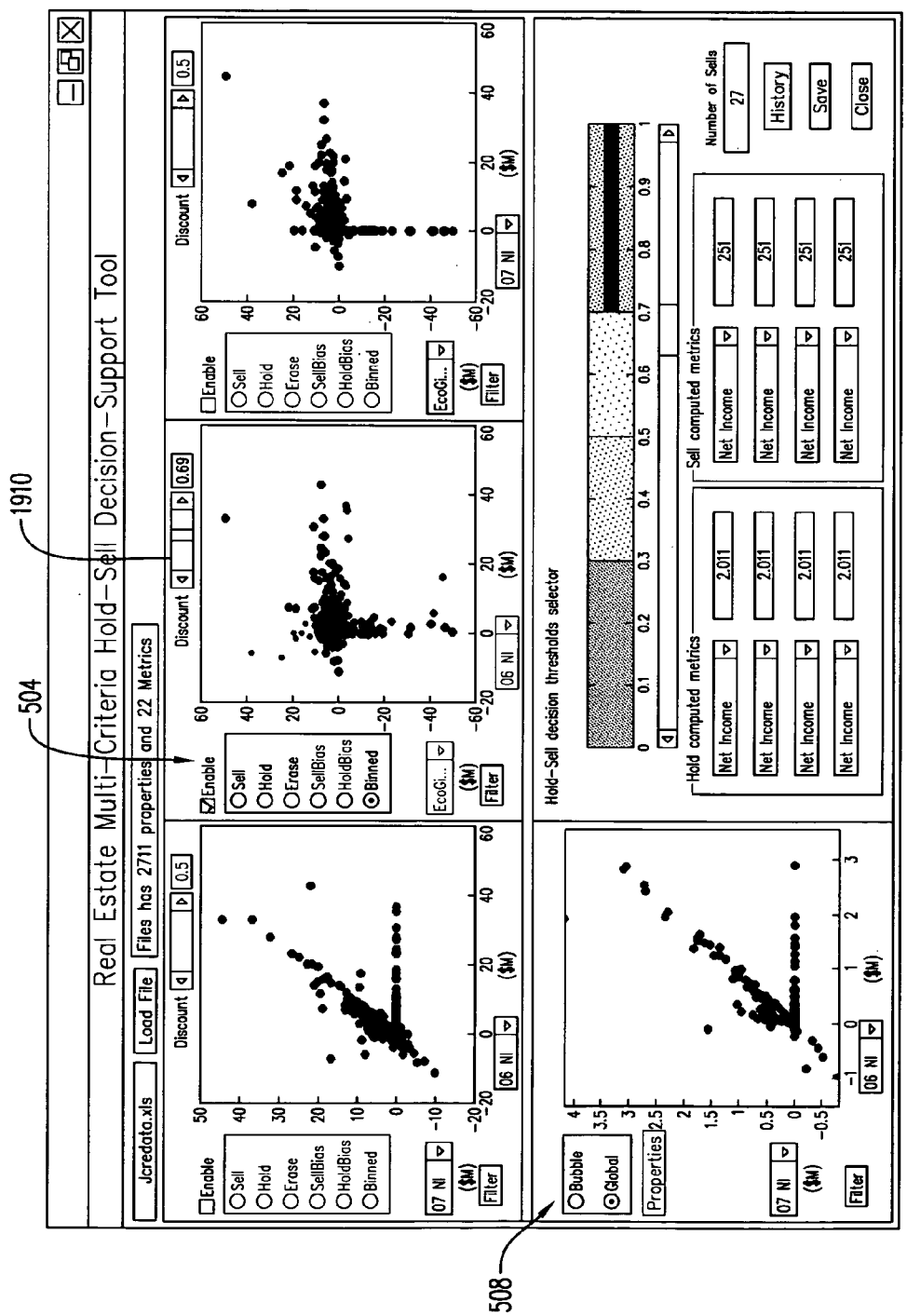

In accordance with a default condition, the bubble graph or scatter-plot graph (as the case may be) displayed in the results graphical display panel represents data for the entire portfolio. However, the user is also allowed to define a subset of the portfolio for which a bubble graph or scatter-plot graph may be displayed in the results graphical display panel. As in the case of the scatter-plot graphs of the data input panels, the definition of a subset of the portfolio for display purposes is referred to as "filtering". The "filter" button 2414 (FIG. 24) included in the results graphical display panel 508 is actuated to access the function of defining the subset of the portfolio for purposes of displaying results of the partition. Actuation of the "filter" button 2414 causes a pop-up 2602 to appear, as seen in FIG. 26. The user may interact with the pop-up 2602 to build a filter definition for the results graphical display panel in the same manner that was described above (in connection with FIGS. 9-14) regarding building of filter definitions for the scatter-plot graphs of the data input panels. FIG. 27 shows a scatter-plot graph in results graphical display panel 508, where the scatter-plot graph reflects data for a subset of the portfolio, with the subset reflecting a filter definition defined by the user.

Figure 28:
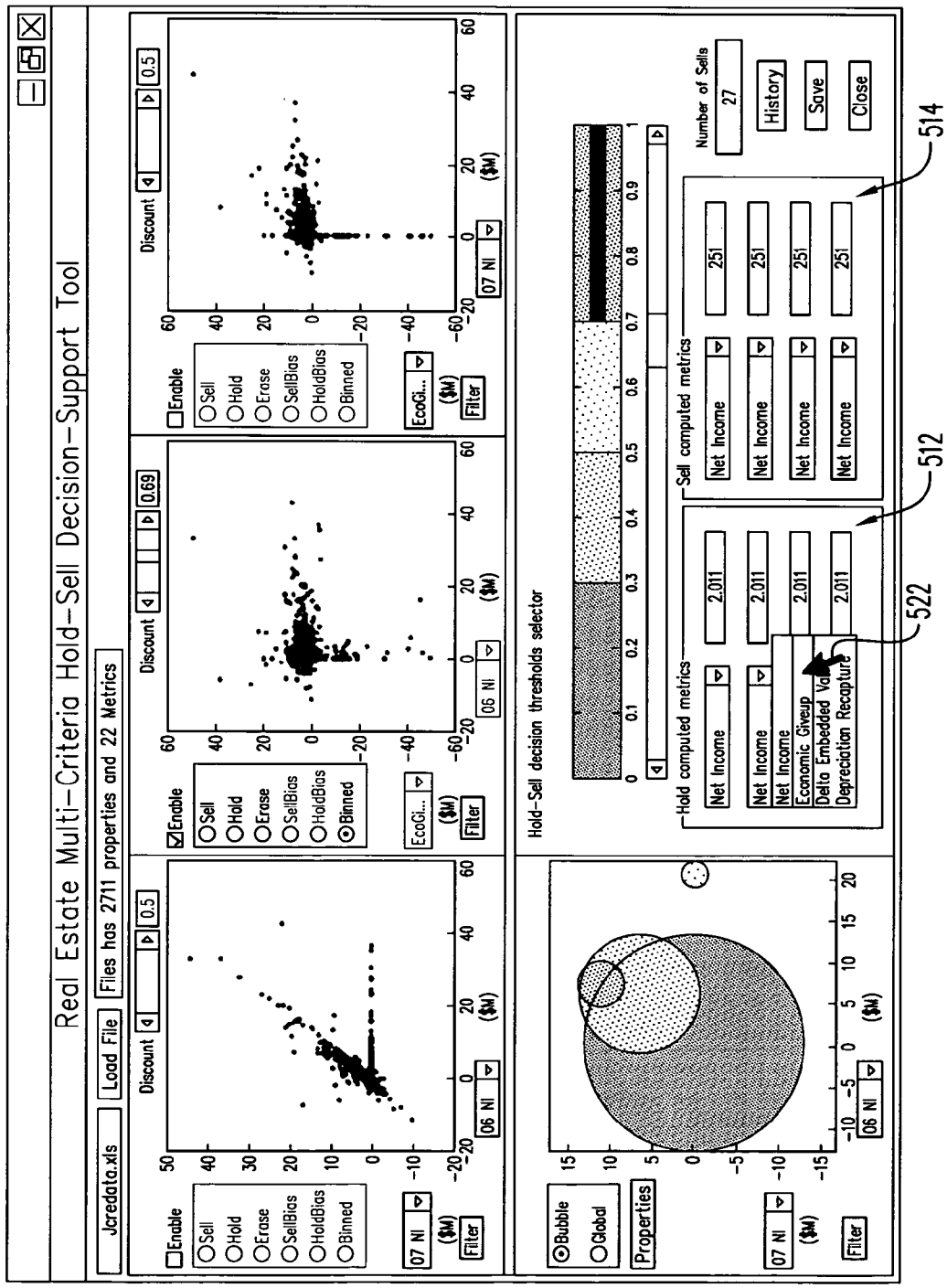
Figure 29:
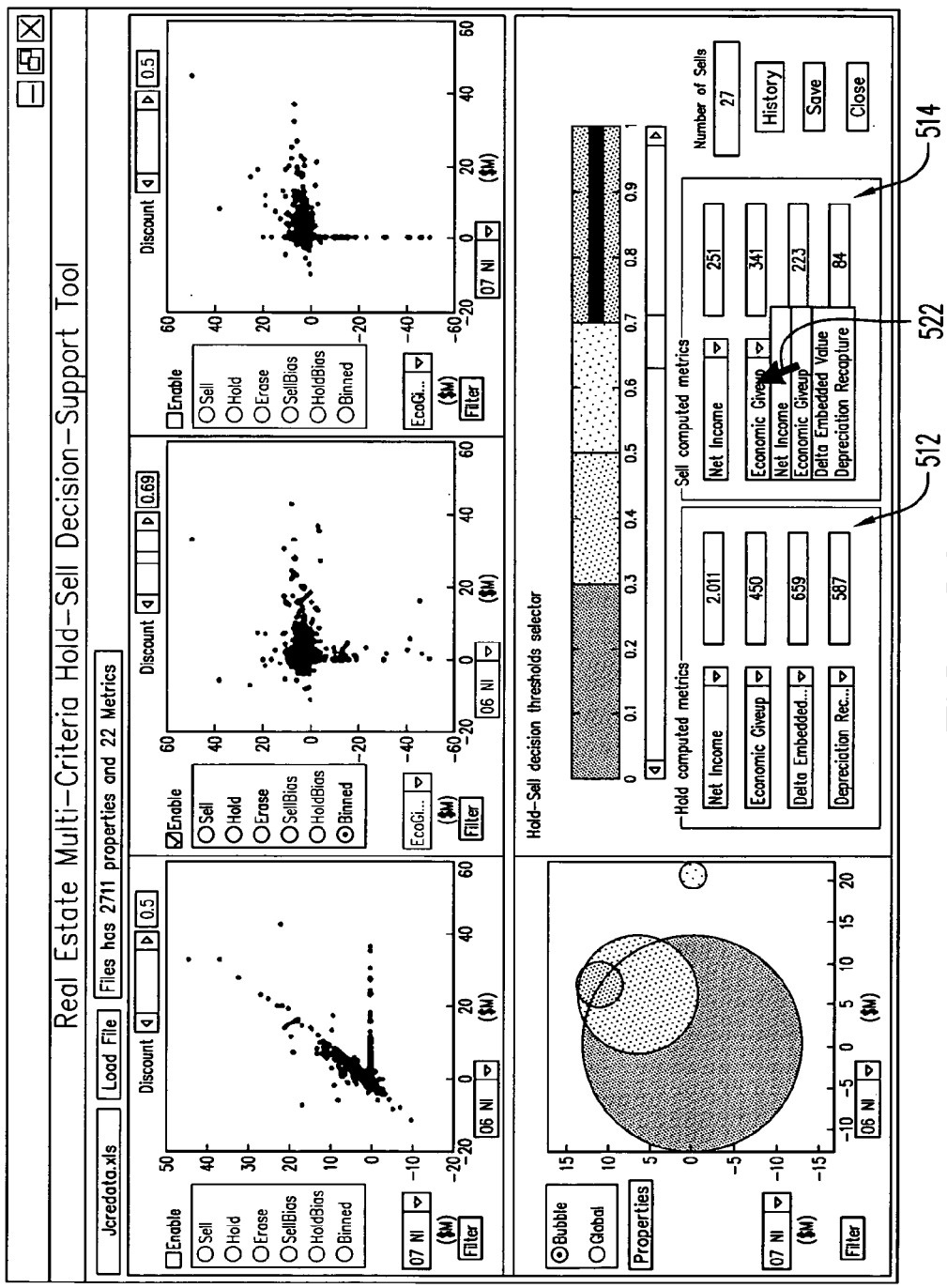
Figure 30:
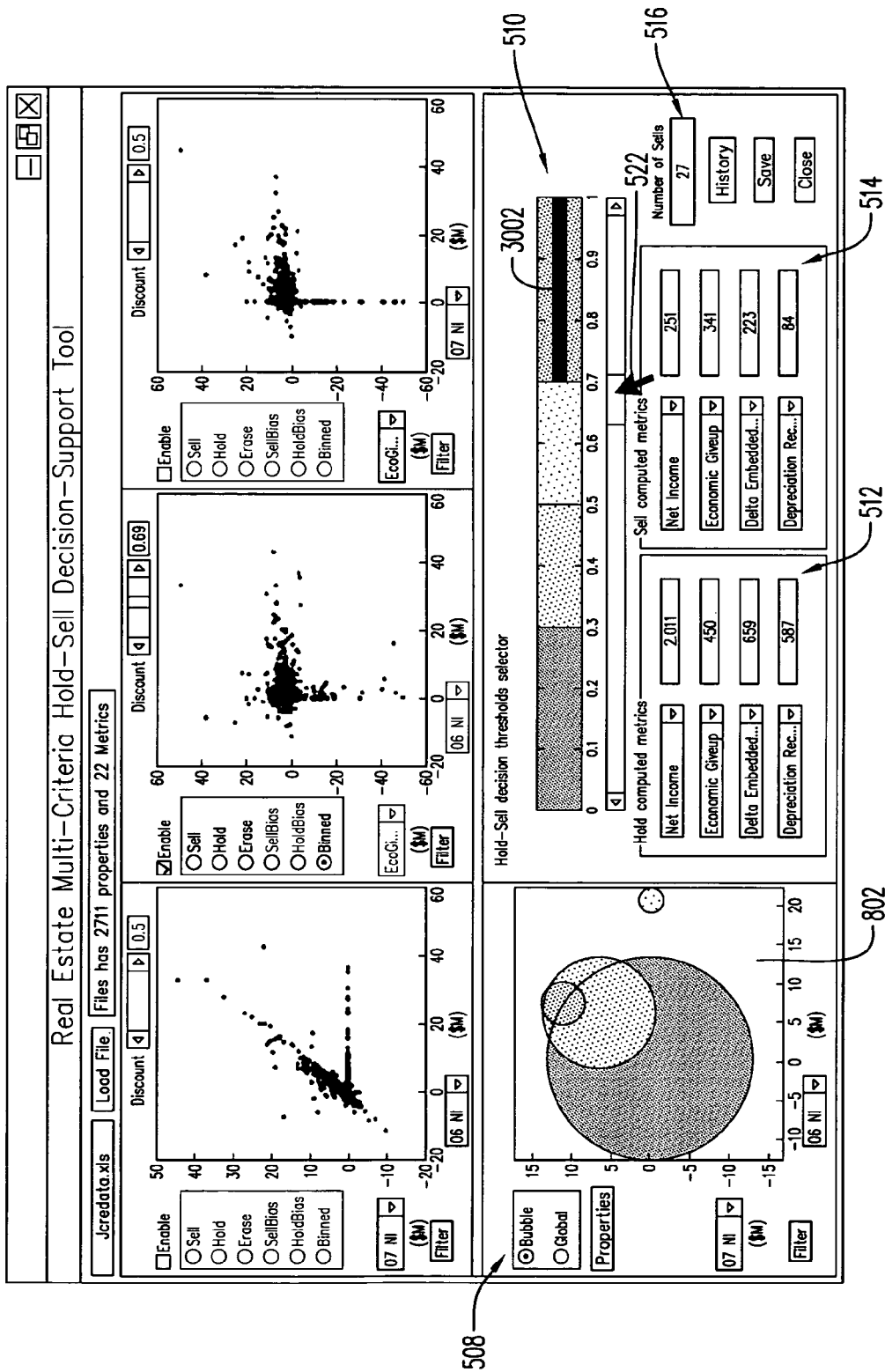

FIGS. 28 and 29 are concerned with allowing the user to select types of data to be displayed in the numeric data display fields 512, 514. The data display fields within 512 are available to display in numeric terms aggregate financial characteristics of all properties in the portfolio that are not recommended for sale by the currently recommended partition of the portfolio. The data display fields within 514 are available to display in numeric terms aggregate financial characteristics of all properties in the portfolio that are recommended for sale by the currently recommended partition of the portfolio. Each of the display fields within 512 and 514 is accompanied by a respective pull-down menu. FIG. 28 shows the cursor 522 (directed by the user) interacting with a pull-down menu in 512 to select from the menu a particular financial characteristic for which aggregated data, for properties recommended to be retained, should be displayed in the associated data display. FIG. 29 shows the cursor 522 interacting with a pull-down menu in 514 to select a particular financial characteristic for which aggregated data, for properties recommended for sale, should be displayed in the associated data display. FIG. 30 shows each of the four data display fields in 512 displaying aggregate data for a different financial characteristic from the other data display fields in 512, and also shows each of the four data display fields in 514 displaying aggregate data for a different financial characteristic from the other data display fields in 514.

FIG. 3A corresponds to a portion of the process of using the decision support tool in which the user enters partitioning preference data. FIG. 3A will now be discussed again in overview. In accordance with the process of FIG. 3A, the user may define one or more two-dimensional projections of criteria space relative to the portfolio. Further, the user may, with respect to each of the projections, enter one or more hold/sell preferences, with each of the preferences to be applied to a respective group of properties selected by the user. The definition of two dimensional projections and entry of data in connection therewith corresponds to the loop 304-318 in FIG. 3A, with the sub-loop 310-314 representing the entry of hold/sell preferences. Filtering (so that assignment of preferences and the associated selection of properties is applied only within a subset of the portfolio) is optional with respect to each two-dimensional projection.

(In some embodiments, the same two-dimensional projection may, by filtering processes, be subdivided into two disjoint subsets of properties, with different partition preference selections being applied to the subsets of the same two-dimensional projection. Two different data input panels may be used for this purpose, or the same data input panel may be used at two different times.) It is contemplated that in many cases the user will find it adequate to define three two-dimensional projections, with one or more partitioning preferences to be entered in the context of each of the three projections. For example the three projections may be:

(1) [a measure of yield] vs. [a measure of risk];

(2) [a measure of the net income available by selling the property (NOI)] vs. [a measure of future income that would be foregone by selling the property (EGU, or "economic give-up")]; and (3) [a measure of book return] vs. [a measure of change in embedded gain].

The layout of the GUI screen display (of FIG. 6 etc.), with its three data input panels 502, 504, 506, conveniently facilitates a three-projection data entry strategy. However, in other embodiments, GUI elements may be present to facilitate re-use of the data input panels, to allow for partition preference data entry using four or more two-dimensional projections of the portfolio in criteria space. For example, each data input panel may have "Save" and "Recall" buttons (not shown). Pressing a "Save" button in a data input panel effectively saves all partition preference data previously entered by the current projection and clears the data input panel so that a new projection (or the same projection with a different filter) may be invoked with the data input panel and used for further entry of partition preference data. Pressing the "Recall" button may allow the user to cycle back to previously defined projections and indications of partitioning preference data input regions (pen color rectangles or quadrants) to permit revisions of previously entered data.

There will next be a discussion of the manner in which the computer system or server processes the partitioning preference data input by the user to generate a recommended partition of the portfolio into a set of properties recommended for sale and another set of properties (disjoint with the first set) not recommended for sale.

It will be recalled that the user enters partitioning preferences by applying pen colors to regions of the scatter-plot graphs of the data input panels. In the embodiment illustrated herein, there are four possible partition preference options: "Hold", "Hold_Bias", "Sell_Bias" and "Sell". (In some alternative embodiments however, the partition preference options could be fewer or greater in number; e.g., in some embodiments the only partition preference options may be "Hold" or "Sell".) When a particular option is applied to a certain region in a data input panel scatter-plot graph, the user is effectively applying that option to every property for which the corresponding data point is present in the region. In other terms, a preference factor $f_p$ is thus applied to the property in question. In the embodiment illustrated herein, $f_p$ is constrained such that $f_p \in \{-1, -0.5, 0.5, 1\}$; with $f_p$ having the value "−1" for the property (for that projection) if the "Hold" partitioning preference is applied to the property; with $f_p$ having the value "−0.5" for the property (for that projection) if the "Hold_Bias" partitioning preference is applied to the property; with $f_p$ having the value "0.5" for the property (for that projection) if the "Sell_Bias" partitioning preference is applied to the property; and with $f_p$ having the value "1" for the property (for that projection) if the "Sell" partitioning preference is applied to the property. (From FIGS. 16-19 and the prior discussion thereof, it will be understood that for some projections it may be the case that no partitioning preference is assigned to some of the properties.) The values of $f_p$ assigned to the properties may be considered "ordinal" in the sense that the values serve to order at least some properties relative to at least some other properties.

It will also be recalled that each two-dimensional projection defined in a data input panel also has, or has assigned to it, a weight (hereinafter represented by the symbol $W_g$). That is, in some embodiments, each projection either has the default weight $W_g=0.5$, or the user selects another value of $W_g$ for that projection by interacting with the slider bar (e.g. item 1910 in FIG. 22) for the corresponding data input panel. In some embodiments, the slider bar may be manipulated by the user to increase the value of $W_g$ for the corresponding projection to any value between 0.5 and 1.0 (including 1.0), or to reduce the value of $W_g$ to any value between 0 and 0.5 (although reducing the value of $W_g$ to 0 would negate any effect on the recommended partition from the partitioning preferences relating to the projection in question).

For each partitioning preference applied to a given property, the computer system/server calculates a preference contribution $C_p = f_p * W_g$. (The calculation of the preference contributions is represented at block 320 in FIG. 3B.) Thus each preference contribution for a given property for a given projection is the product of the partitioning preference factor assigned to the property and the projection weight applicable to the projection, and may also be referred to as a modified partitioning preference selection factor. For each data input panel, it will be understood that a respective vector of modified partitioning preference selection factors may be produced.

Next, for each property the preference contributions for the property are summed (block 322) to produce an aggregate preference contribution $\Sigma C_p$ for the property. The aggregate preference contribution for a particular property may also be thought of as a raw partition score $S_{rpt}(=\Sigma C_p)$ for the property. Since the values of $f_p$ may be negative or positive, it will be appreciated that the raw partition scores also may be negative or positive (or zero, if all of the entered preferences for a property cancel out). Thus the universe of raw partition scores may be considered to represent an accumulation of the vectors of modified partitioning preference selection factors.

The computer system/server then normalizes (block 324) the raw partition scores ($S_{rpt}$) to generate mapped partition scores ($S_{mpt}$). That is, a first mapping function $f_{m-}$ (applicable to negative raw partition scores) monotonically maps [min$(S_{rpt}),0$] to $[0,0.5]$, with $S_{mpt}=f_{m-}(S_{rpt})$ for $S_{rpt} \leq 0$. A second mapping function $f_{m+}$ (applicable to positive raw partition scores) monotonically maps [0,max$(S_{rpt})$] to $[0.5,1]$, with $S_{mpt}=f_{m+}(S_{rpt})$ for $S_{rpt}>0$. Preferably $f_{m-}$ operates such that for two raw, negative partition scores $S_{rpti}, S_{rptj}(S_{rpti}<S_{rptj})$:

$$f_{m-}(S_{rpti}) < f_{m-}(S_{rptj}) \text{ and } [f_{m-}(S_{rptj}) - f_{m-}(S_{rpti})] \propto (S_{rptj} - S_{rpti}).$$

Also preferably $f_{m+}$ operates such that for two raw, positive partition scores $S_{rptk}, S_{rptl}(S_{rptk}<S_{rptl})$:

$$f_{m+}(S_{rptk}) < f_{m+}(S_{rptl}) \text{ and } [f_{m+}(S_{rptl}) - f_{m+}(S_{rptk})] \propto (S_{rptl} - S_{rptk}).$$

In other words, negative raw partition scores are mapped to the interval [0,0.5] and positive raw partition scores are mapped to the interval [0.5,1], with the mapped partition score of 0.5 being assigned to properties that have a zero raw partition score or for which no partition preference has been assigned in any projection (i.e., the default value of $S_{mpt}$ is 0.5). Moreover, it is preferable that the difference between two mapped partition scores in the range [0,0.5] be proportional to the difference between the two corresponding raw partition scores, and that the difference between two mapped partition scores in the range [0.5,1] be proportional to the difference between the two corresponding raw partition scores. The mapped partition scores may also be regarded as being normalized partitioning preference selection factors.

As a result of the calculations described above and represented by the blocks 320-324 in FIG. 3B, every property has effectively been assigned a mapped partition score in the range [0,1], with a higher mapped partition score indicating a greater preference toward selling the property. It now only remains to set a partition threshold $T_p$ in the range [0,1]. With a value established for $T_p$, the portfolio may be partitioned into a set of properties (recommended for sale) for which $S_{mpt}>T_p$ and a set of properties (recommended for retention) for which $S_{mpt} \leq T_p$. $T_p$ may also be thought of as a set decomposition threshold.

In some embodiments of the invention, the default value of $T_p$ is set to 0.7. However, it is preferable that the user be permitted to decrease $T_p$ to a value between 0 and 0.7 to produce a more aggressive selling recommendation or to increase $T_p$ to a value between 0.7 and 1 to produce a less aggressive selling recommendation.

The above-mentioned threshold-setting slider bar 510 (as indicated for example in FIG. 30) is the GUI element included in the GUI screen display to permit the user to adjust the value of $T_p$. As seen from FIG. 30, the user may employ the cursor 522 to interact with the slider bar 510. The solid black displayed graphic bar 3002 indicates the current setting of the value of $T_p$.

Figure 31:
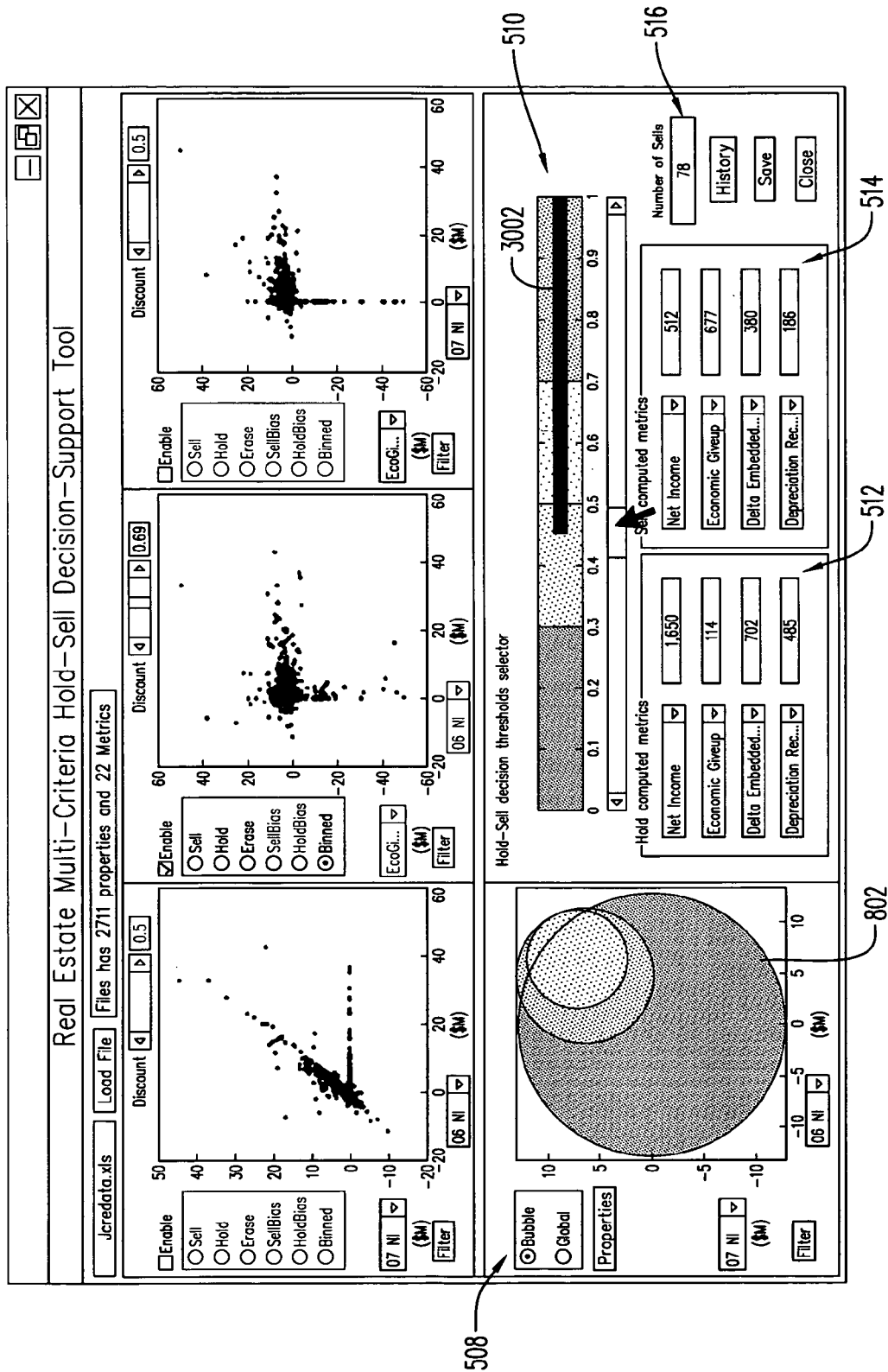

In FIG. 31, the value of $T_p$ has been reduced from the default value of 0.7 to about 0.45, to produce a partition with a much more aggressive selling recommendation (more properties recommended for sale, fewer properties recommended for retention). The resulting change in the partition is reflected in the results graphical display panel 508 (specifically in the bubble graph 802), and also in the partition statistical (aggregate) data presented in the numeric data display fields 512, 514, 516.

Figure 32:
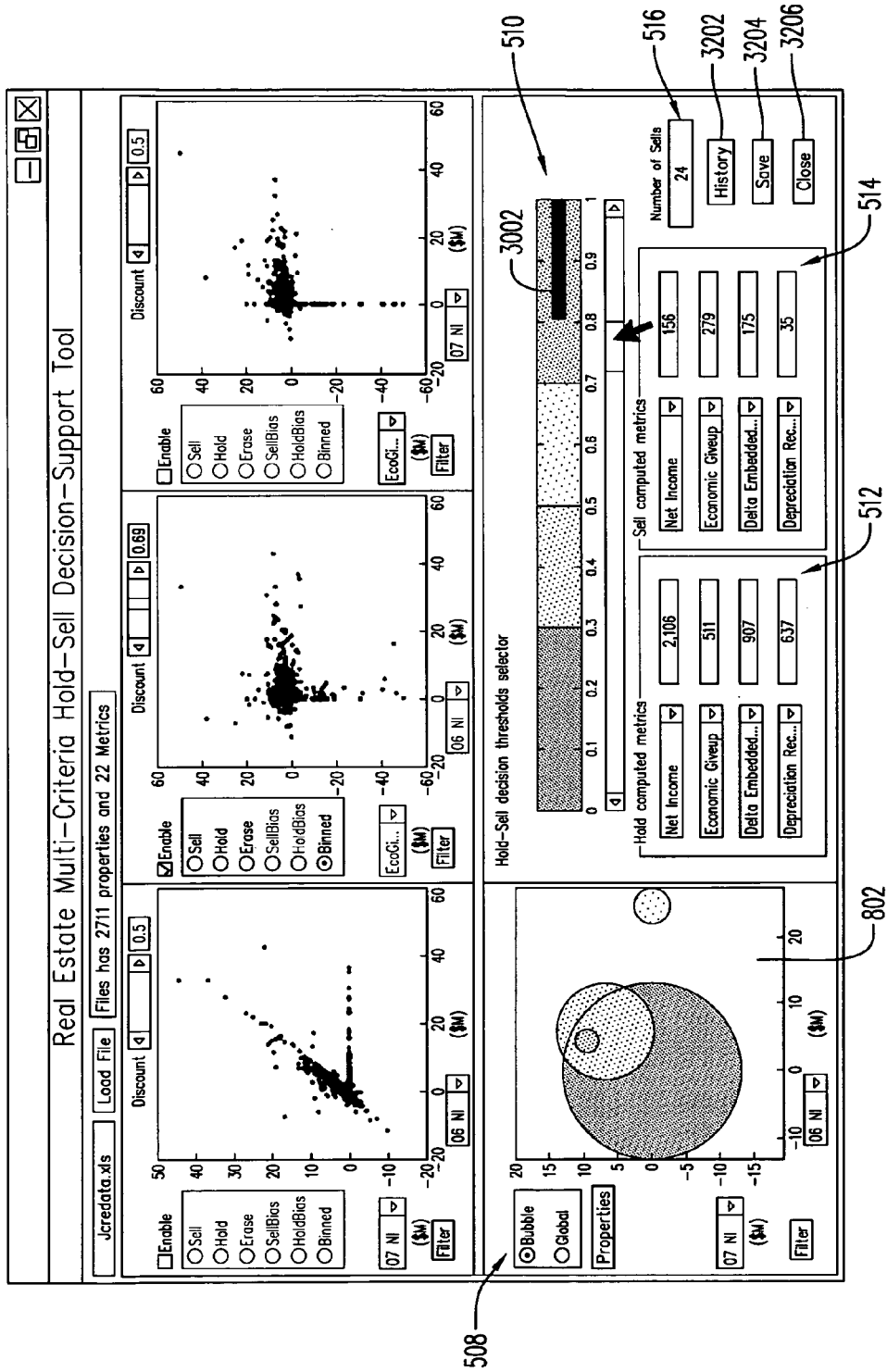

In FIG. 32, the value of $T_p$ has been increased to about 0.8 to produce a less aggressive selling recommendation. The resulting change in the partition is again reflected in the bubble graph and the numeric data display fields.

The subject matter presented in FIGS. 30-32 can also be understood in conjunction with FIG. 3B, in which decision block 326 corresponds to a determination as to whether the user has input an instruction to change $T_p$. If so, then, $T_p$ is changed (block 328). If not, the previous value of $T_p$ (possibly the default value of $T_p$) remains in effect, as indicated by block 330. In either case, as indicated by block 332, the portfolio may be partitioned based on the currently effective value of $T_p$ and based on the mapped partition scores that have been assigned to the properties in the portfolio.

Now that the concepts of "mapped partition score" ($S_{mpt}$) and "partition threshold" ($T_p$) have been discussed, further features of the bubble graph may be described. In some embodiments, the bubble graph displays up to four bubbles:

(A) One bubble presents aggregate data for the group of properties currently recommended for sale (i.e., the set of all properties for which $S_{mpt}>T_p$). (If no partition has yet been set—e.g. if no partition preference data has been entered—this bubble is not included in the bubble graph.)

(B) Another bubble (not necessarily included at any given time) presents aggregate data for the group of properties for which $0.5<S_{mpt}\leq T_p$. This group of course is the empty set, and the corresponding bubble is omitted from the bubble graph, if $T_p$ currently has a value that is less than or equal to 0.5. This bubble may be interpreted as representing a group of properties which are not currently recommended for sale but for which there is a "Sell Bias" (in a "results" sense, rather than in a "partition preference assignment" sense).

(C) A third bubble (also not necessarily included at any given time) presents aggregate data for the group of properties for which $0.3<S_{mpt}\leq 0.5$, provided that $T_p>0.5$. However, if $0.3<T_p\leq 0.5$, then this bubble presents aggregate data for the group of properties for which $0.3<S_{mpt}\leq T_p$. This group is the empty set, and the corresponding bubble is omitted from the bubble graph, if $T_p$ currently has a value that is less than or equal to 0.3. This bubble may be interpreted as representing a group of properties, not currently recommended for sale, for which there is a "Hold Bias" (again in a "results" sense, rather than in a "partition preference assignment" sense).

(D) A fourth bubble presents aggregate data for the group of properties for which $S_{mpt}\leq 0.3$ (or for which $S_{mpt}\leq T_p$, in a case where $T_p<0.3$). This bubble may be interpreted as representing a group of properties, not currently recommended for sale, and for which the user's input has resulted in a "Strong Hold" score. In some embodiments the fourth bubble may not be present (and only the "Hold Bias" bubble is present) prior to entry of any partition preference data, since all properties would then be assigned the default $S_{mpt}$ value of 0.5.

Referring again to FIG. 32, the GUI screen display includes, in its lower right-hand corner, a "History" button 3202. When the user actuates the "History" button 3202, the computer system/server may display a screen display like that shown in FIG. 33. The screen display of FIG. 33 includes, at its left-hand side, a selection field 3302. The selection field 3302 contains information that reflects actions that have been taken by the user to enter partitioning preference data. For example, the selection field 3302 may contain entries that identify the two-dimensional projections in criteria space that the user defined. Also, one or more entries in the selection field 3302 may indicate which types of preferences (e.g., "Hold", "Sell", "Binned", etc.) that the user indicated in connection with each of the projections. Still further, one or more entries in the selection field 3302 may indicate that the user defined a filter with respect to one or more of the two-dimensional projections.

Figure 33:
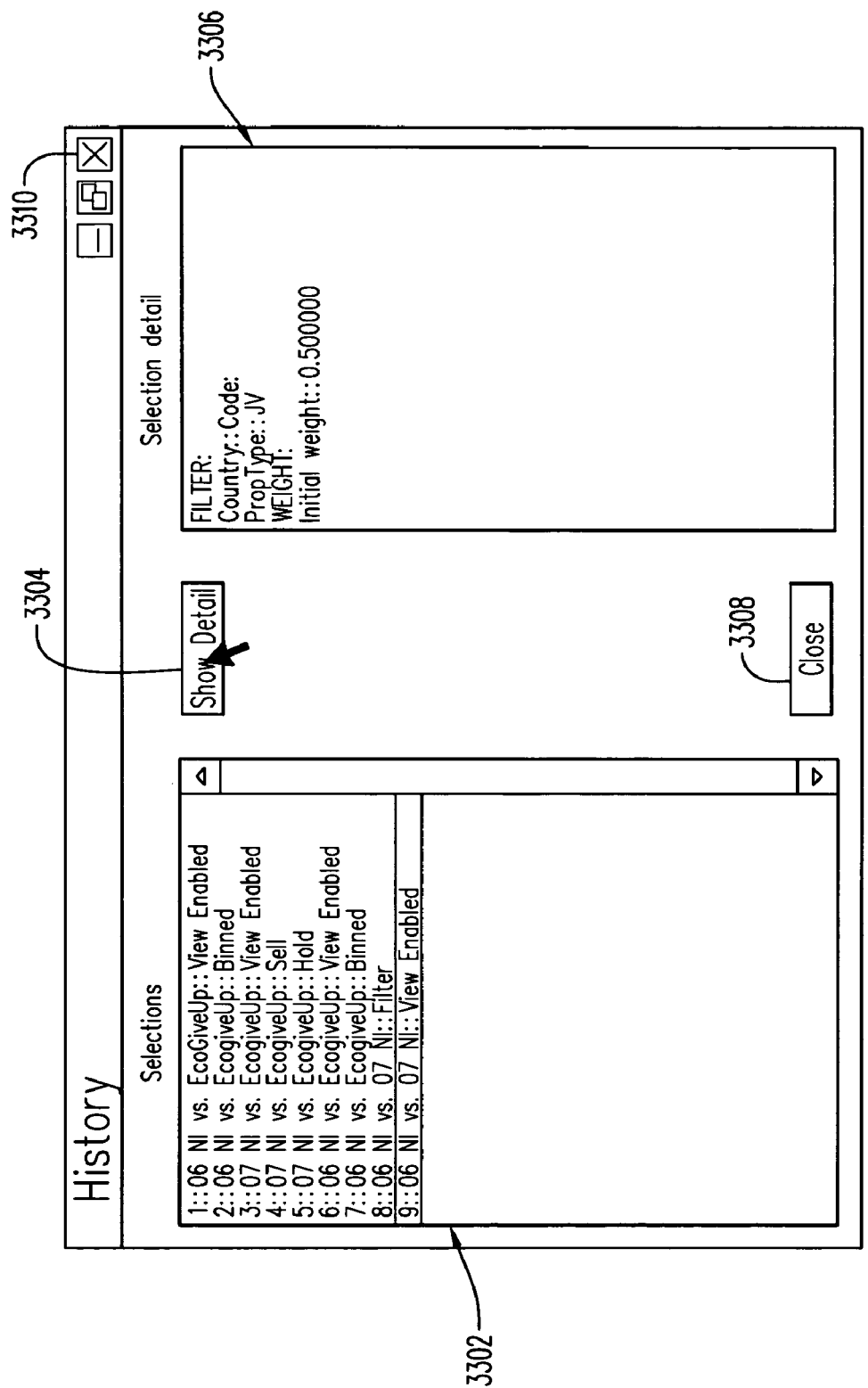

The screen display of FIG. 33 also includes a "Show detail" button 3304. When the user actuates the "Show detail" button 3304, additional information is displayed in a details field 3306. The additional information may be related to a two-dimensional projection or other action represented by a selected entry in the selection field 3302.

If the user actuates either of the close buttons 3308, 3310 in the screen display of FIG. 33, the computer system/server returns to displaying the main GUI screen display (e.g., FIG. 32).

Figure 34:
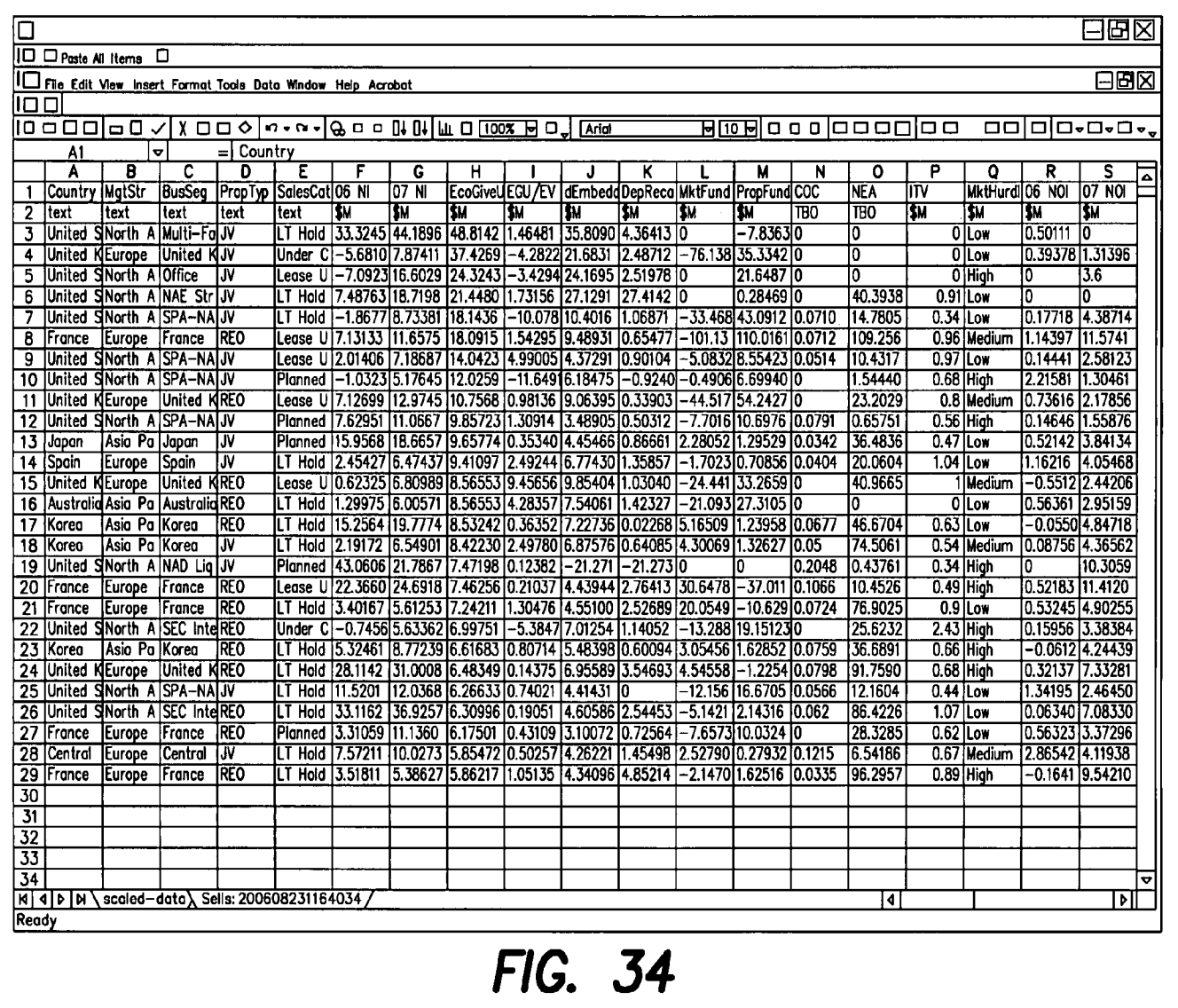

As is further seen in FIG. 32, the main GUI screen display also includes a "Save" button 3204 and a "Close" button 3206. Upon the user actuating either of these buttons, the computer system/server saves data that reflects the currently-effective partition of the portfolio, and the computer system/server also displays a screen display of the type shown in FIG. 34. FIG. 34 is in the form of a spreadsheet that lists, as its line items, each of the properties recommended for sale as a result of the currently-effective partition of the portfolio. The user may modify the data he/she entered regarding partitioning preferences (including definition of new two-dimensional projections and/or adjustments to the value of the partition threshold $T_p$) and/or may enter entirely new sets of preference data, and may save each of the resulting partitions in the form of additional spreadsheets.

In some embodiments, the properties recommended for sale may be rank-ordered (e.g., as displayed in the results spreadsheet of FIG. 34) according to the mapped partition scores that have been assigned to the properties (e.g., the properties may be ranked in descending order by mapped partition score). Moreover, the entire portfolio may be effectively rank-ordered by mapped partition score (or alternatively by raw partition score) to indicate the hold vs. sell sentiments indicated by the partitioning preference data entered by the user.

It will be appreciated that the details of the main GUI screen display may be modified in a number of ways while still providing substantially the same functionality to the user. For example, there may be more or fewer than the three data input panels shown. Moreover, instead of independently selecting the parameters for the graph axes by a respective pull-down menu for each axis, there may alternatively be a single pull-down menu listing parameter-pairs as menu options. Still further, GUI elements other than slider bars may be provided for setting of projection weights $W_g$ and/or the partition threshold $T_p$.

There are also modifications that may be applied to the calculations described herein while still providing substantially the same functionality. For example, raw partition scores may be mapped to intervals [0,50] and [50,100], and the partition threshold may be set in a range of [0,100].

FIGS. 3A and 3B, and the above description of the process illustrated by those drawings, should not be considered to imply a fixed order of performing the steps of the process. Rather, the steps may be performed in any order that is practicable. Many of the steps shown in FIGS. 3A and 3B as sequential to other steps may be performed in another sequence, such as prior to, interspersed with, or immediately triggered by, steps shown as prior in the sequence. For example, on each occasion that step 312 (entry of a partitioning preference) is performed, the calculations/processes of steps 320, 322, 324 and 332 may be immediately redone. Similarly, changing of a projection weight (step 316) may trigger all recalculations required to generate a new partition.

A decision support tool of the type disclosed herein may be applied with respect to many other set partition problems besides making hold/sell decisions for a real estate portfolio of commercial and/or residential-rental properties. For example, a similar decision support tool may be provided to hold/sell partition a portfolio of energy-related assets such as power-generation plants and oil or gas pipelines.

As another alternative, a decision support tool like that described hereinabove may be employed to partition a population of properties available for acquisition into a set of properties recommended to be bought and a set not recommended to be bought.

Another partition problem that may be usefully addressed by a decision support tool of this type is to determine which subset of assets of a set of transportable assets (e.g., military assets) should be deployed to a remote site for a given project (e.g., a response to an emergency situation, a military campaign). Other partition decisions that may be taken with respect to the assets are whether to mobilize or not mobilize (stay in place), whether to fire or hold fire, whether to maintain in commission or decommission, whether to place in action or hold in inaction, whether to operate the asset or keep it idle, whether to trade or retain the asset.

Similarly, a portfolio of financial instruments may be partitioned with the assistance of this type of decision support tool. The partitioning of the portfolio may be in terms of decisions such as hold vs. sell, approve vs. reject, buy vs. don't buy, trade vs. retain, take action vs. don't take action, etc.

A decision support tool of this type may also be usefully applied, in some embodiments, to a network television programming "portfolio" by partitioning a line-up of primetime (and/or other programming times) programs between a set of programs to be dropped from the schedule and a set of programs to be retained. As may be inferred by previous discussion, the programs may also or alternatively be rank-ordered based on raw and/or mapped partition scores.

A similar decision support tool may also be provided for rank-ordering and/or partitioning a population of athletes that are potentially available as draft or recruiting prospects, trade prospects, etc. Such a tool may also or alternatively rank-order or partition (for retention or release/trade) athletes currently under contract to a professional sports team.

The decision support tool disclosed herein contemplates that only a single user (e.g., a single portfolio analyst) inputs partitioning preference data. However, in some alternative embodiments, two or more different users may be allowed to input partitioning preference data using a GUI like that disclosed herein, to obtain a group view of how a portfolio might best be hold/sell partitioned. The partitioning preferences input by the users may, in some embodiments, be aggregated at the level of the above-described raw partition scores or mapped partition scores, or after some sort of normalization of raw partition scores. In some embodiments, different weights may be applied to the partitioning preferences of various collaborating users, so that the raw and/or mapped partition scores reflect the opinions of some users more heavily than the opinions of other users. In some embodiments, a single "master" user may have control of setting the value of the partition threshold $T_p$ and/or setting the weights to be applied to the input from the various users.

One merit of the decision support tool disclosed herein is that it does not require time-consuming design of a complex machine-intelligence system to produce a computer-determined portfolio partition solution. Such a system may also be computationally intensive. Instead, the present decision support tool provides a powerful interface to allow the user to apply his/her own intelligence to the portfolio partition problem. In addition, the decision support tool effectively collates the partitioning preferences input by the user to translate those preferences into a partition solution that essentially reflects the user's insights. It is expected that in many cases the list of properties recommended for sale as a result of using the tool will serve as a starting point for further analysis and decision-making concerning which properties are to be sold.

Another valuable feature of the decision support tool is its presentation of data in such a way that the user can readily grasp the consequences of the user's preferences or threshold adjustments.

The present invention has the technical effect of facilitating and improving the operation of data processing equipment in managing real estate portfolios or other collections of assets.

As used herein and in the appended claims, "database" may refer to one or more related or unrelated databases. Data may be "stored" in raw, excerpted, summarized and/or analyzed form.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer-implemented method comprising:

receiving, by a processor, an indication of a first partitioning preference with respect to a first subgroup of a population of items from a user;

receiving, by the processor, an indication of a first weighting factor that is applicable to said first subgroup from the user;

receiving, by the processor, an indication of a second partitioning preference with respect to a second subgroup of the population of items;

receiving, by the processor, an indication of a second weighting factor that is applicable to said second subgroup from the user;

receiving, by the processor, an indication of a third partitioning preference with respect to a third subgroup of the population of items from the user;

receiving, by the processor, an indication of a third weighting factor that is applicable to said third subgroup from the user;

multiplying, by the processor, the first weighting factor with a value that corresponds to said first partitioning preference to generate a first product;

multiplying, by the processor, the second weighting factor with a value that corresponds to said second partitioning preference to generate a second product;

multiplying, by the processor, the third weighting factor with a value that corresponds to said third partitioning preference to generate a third product;

using the first, second and third products to generate, by the processor, a respective raw partition score for each of at least some of said items;

mapping, by the processor, the raw partition scores to an interval of numbers to generate mapped partition scores for each of said at least some of said items;

receiving, by the processor, an indication of a partition threshold from the user; and partitioning, by the processor, the population of items based at least in part on said partition threshold and said mapped partition scores.

2. The method of claim 1, wherein the interval is equal to [0,1].

3. The method of claim 1, wherein the population of items is a portfolio of real estate properties and the partition preferences are hold/sell preferences.

4. The method of claim 3, wherein said values that correspond to the partition preferences are each selected from the set $\{-1, -0.5, 0.5, 1\}$.

5. The method of claim 1, wherein the first, second and third subgroups are all disjoint.

6. The method of claim 1, wherein the first, second and third subgroups are not all disjoint.

7. The method of claim 1, further comprising:
receiving, by the processor, an indication of a fourth partitioning preference with respect to a fourth subgroup of the population of items;
wherein the first weighting factor is applicable to the fourth subgroup, said fourth subgroup disjoint with said first subgroup, said fourth partitioning preference different from said first partition preference.

8. The method of claim 7, further comprising:
multiplying, by the processor, the first weighting factor with a value that corresponds to said fourth partitioning preference to generate a fourth product different from said first product; and
using said fourth product to generate, by the processor, some of the respective raw partition preference scores.

9. The method of claim 7, wherein the indications of the first and fourth partition preferences are received by detecting respective regions defined by a user in a screen display.

10. The method of claim 1, wherein said indications are received from a user's interactions with a graphical user interface provided by a computer.

\* \* \* \* \*